US006977630B1

(12) United States Patent
Donath et al.

(10) Patent No.: US 6,977,630 B1
(45) Date of Patent: Dec. 20, 2005

(54) MOBILITY ASSIST DEVICE

(75) Inventors: Max Donath, St. Louis Park, MN (US); Craig R. Shankwitz, Minneapolis, MN (US); Heon Min Lim, St. Paul, MN (US); Bryan Newstrom, Blaine, MN (US); Alec Gorjestani, Minneapolis, MN (US); Sameer Pardy, Minneapolis, MN (US); Lee Alexander, Woodbury, MN (US); Pi-Ming Cheng, Roseville, MN (US)

(73) Assignee: University of Minnesota, Minneapolis, MN (US)

( * ) Notice: Subject to any disclaimer, the term of this patent is extended or adjusted under 35 U.S.C. 154(b) by 486 days.

(21) Appl. No.: 09/618,613

(22) Filed: Jul. 18, 2000

(51) Int. Cl.[7] .................................................. G09G 5/00
(52) U.S. Cl. .................... 345/7; 345/8; 345/9; 701/208; 701/211
(58) Field of Search ............................. 345/7–9; 701/1, 701/23–24, 200, 207–225, 300–302; 359/13, 630, 63; 250/280.1, 280.2; 342/1, 42, 35, 357, 450; 356/3, 27

(56) References Cited

U.S. PATENT DOCUMENTS

| | | | | |
|---|---|---|---|---|
| 4,120,566 A | * | 10/1978 | Sanci et al. ................. 359/676 |
| 5,214,757 A | * | 5/1993 | Mauney et al. ............. 340/990 |
| 5,231,379 A | * | 7/1993 | Wood et al. ................. 340/980 |
| 5,291,338 A | * | 3/1994 | Bezard et al. ................ 180/90 |
| 5,414,439 A | * | 5/1995 | Groves et al. ................. 345/7 |
| 5,497,271 A | * | 3/1996 | Mulvanny et al. ........... 359/631 |
| 5,499,325 A | * | 3/1996 | Dugan, Jr. .................... 345/594 |
| 5,517,419 A | | 5/1996 | Lanckton et al. ............ 364/449 |
| 5,543,789 A | | 8/1996 | Behr et al. ................... 340/995 |
| 5,734,358 A | * | 3/1998 | Sumiyoshi ....................... 345/7 |

(Continued)

FOREIGN PATENT DOCUMENTS

| | | |
|---|---|---|
| EP | 1 096 229 A1 | 3/2000 |
| WO | WO 01/11388 A1 | 2/2001 |

OTHER PUBLICATIONS

Office Communication from U.S. Appl. No. 10/091,182 filed Mar. 5, 2002. Date of Office Communication May 21, 2004.
Office Communication from Application No. 09/968,724 filed Oct. 1, 2001. Date of Office Communication Dec. 1, 2004.
Course Notes for "Programming with open GL: Advanced Techniques", Conference 3.8 Aug. 1997, pp. 1–3 and 83–102.

*Primary Examiner*—Vijay Shankar
*Assistant Examiner*—Leonid Shapiro
(74) *Attorney, Agent, or Firm*—Westman, Champlin & Kelly

(57) ABSTRACT

The present invention is directed to a visual mobility assist device which provides a conformal, augmented display to assist a moving body. When the moving body is a motor vehicle, for instance (although it can be substantially any other body), the present invention assists the driver in either lane keeping or collision avoidance, or both. The system can display objects such as lane boundaries, targets, other navigational and guidance elements or objects, or a variety of other indicators, in proper perspective, to assist the driver.

51 Claims, 18 Drawing Sheets

U.S. PATENT DOCUMENTS

| | | | |
|---|---|---|---|
| 5,808,566 A | 9/1998 | Behr et al. | 340/995 |
| 5,848,373 A * | 12/1998 | DeLorme et al. | 340/990 |
| 5,872,526 A * | 2/1999 | Tognazzini | 340/961 |
| 5,926,117 A | 7/1999 | Gunji et al. | 340/988 |
| 5,951,620 A | 9/1999 | Ahrens et al. | 701/200 |
| 5,953,722 A | 9/1999 | Lampert et al. | 707/100 |
| 5,966,132 A | 10/1999 | Kakizawa et al. | 345/419 |
| 5,999,878 A | 12/1999 | Hanson et al. | 710/208 |
| 6,038,559 A | 3/2000 | Ashby et al. | 707/4 |
| 6,047,234 A | 4/2000 | Cherveny et al. | 701/200 |
| 6,104,316 A | 8/2000 | Behr et al. | 340/995 |
| 6,107,944 A | 8/2000 | Behr et al. | 340/995 |
| 6,122,593 A | 9/2000 | Friederich et al. | 701/202 |
| 6,161,071 A | 12/2000 | Shuman et al. | 701/48 |
| 6,166,698 A * | 12/2000 | Turnbull et al. | 343/700 MS |
| 6,184,823 B1 | 2/2001 | Smith et al. | 342/357.13 |
| 6,188,957 B1 | 2/2001 | Bechtolsheim et al. | 701/209 |
| 6,192,314 B1 | 2/2001 | Khavakh et al. | 701/209 |
| 6,208,934 B1 | 3/2001 | Bechtolsheim et al. | 701/209 |
| 6,212,474 B1 | 4/2001 | Fowler et al. | 701/211 |
| 6,218,934 B1 * | 4/2001 | Regan | 340/438 |
| 6,226,389 B1 * | 5/2001 | Lemelson et al. | 382/104 |
| 6,249,742 B1 | 6/2001 | Friederich et al. | 701/202 |
| 6,253,151 B1 | 6/2001 | Ohler et al. | 701/208 |
| 6,272,431 B1 * | 8/2001 | Zamojdo et al. | 348/115 |
| 6,278,942 B1 | 8/2001 | McDonough | 701/210 |
| 6,289,278 B1 * | 9/2001 | Endo et al. | 701/208 |
| 6,298,303 B1 | 10/2001 | Khavakh et al. | 701/209 |
| 6,308,177 B1 | 10/2001 | Israni et al. | 707/100 |
| 6,314,365 B1 | 11/2001 | Smith | 701/200 |
| 6,314,367 B1 | 11/2001 | Ohler et al. | 701/208 |
| 6,361,321 B1 | 3/2002 | Huston et al. | 434/69 |
| 6,370,475 B1 | 4/2002 | Breed et al. | 701/301 |
| 6,385,539 B1 | 5/2002 | Wilson et al. | 701/213 |
| 6,405,132 B1 | 6/2002 | Breed et al. | 701/301 |
| 6,438,491 B1 | 8/2002 | Farmer | 701/301 |
| 6,486,856 B1 * | 11/2002 | Zink | 345/7 |
| 6,526,352 B1 | 2/2003 | Breed et al. | 701/213 |
| 2002/0184236 A1 | 12/2002 | Donath et al. | 707/104.1 |
| 2003/0023614 A1 | 1/2003 | Newstrom et al. | 707/104.1 |
| 2003/0128182 A1 | 7/2003 | Donath et al. | 345/156 |
| 2004/0066376 A1 | 4/2004 | Donath et al. | 345/169 |

* cited by examiner

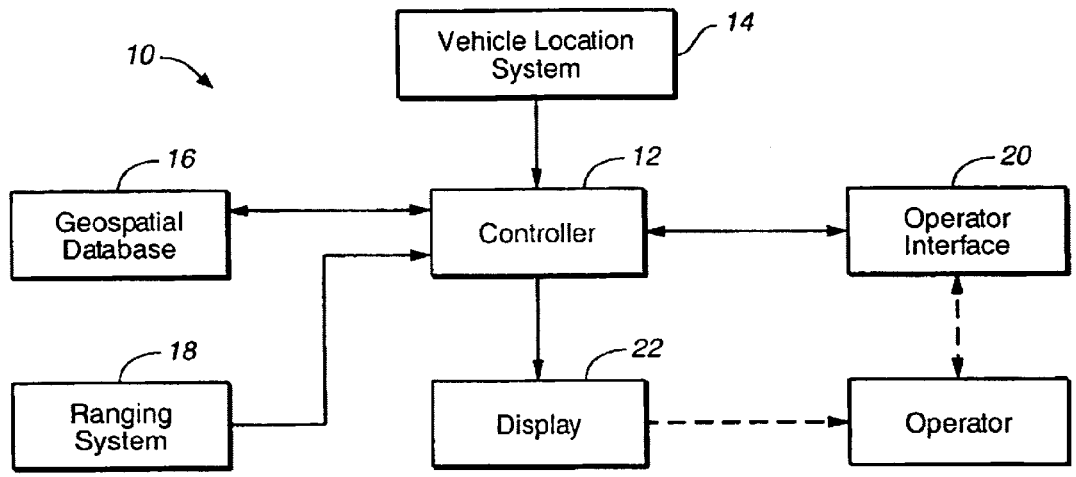
FIG._1
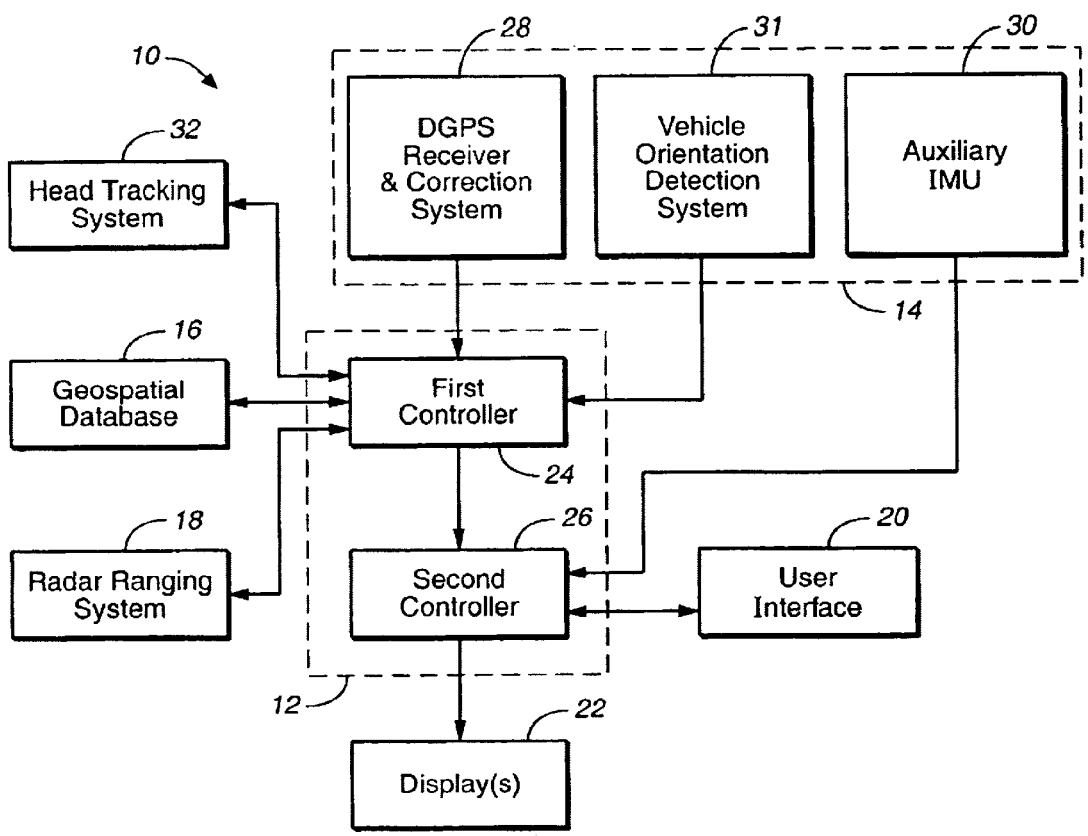
FIG._2

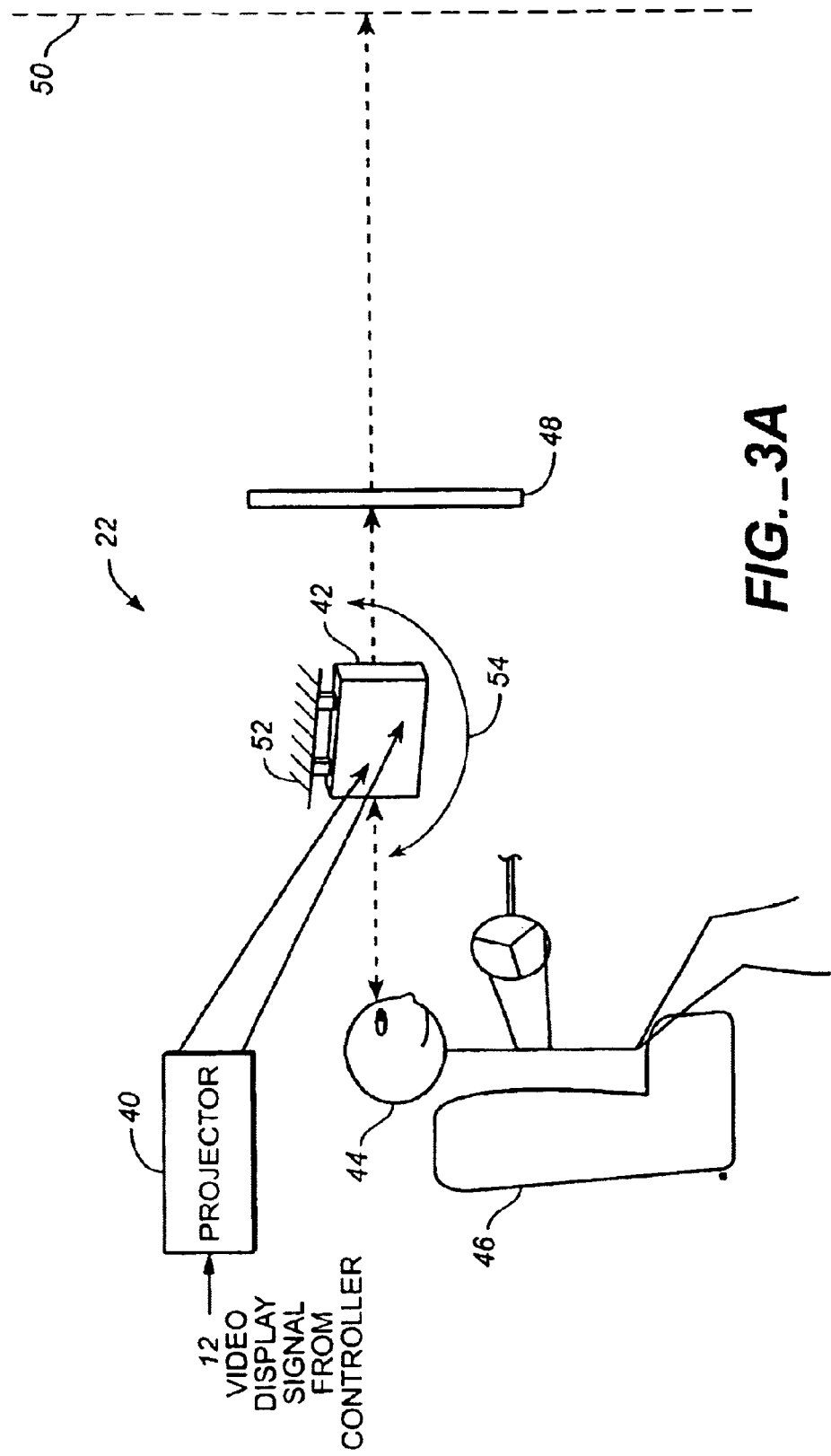

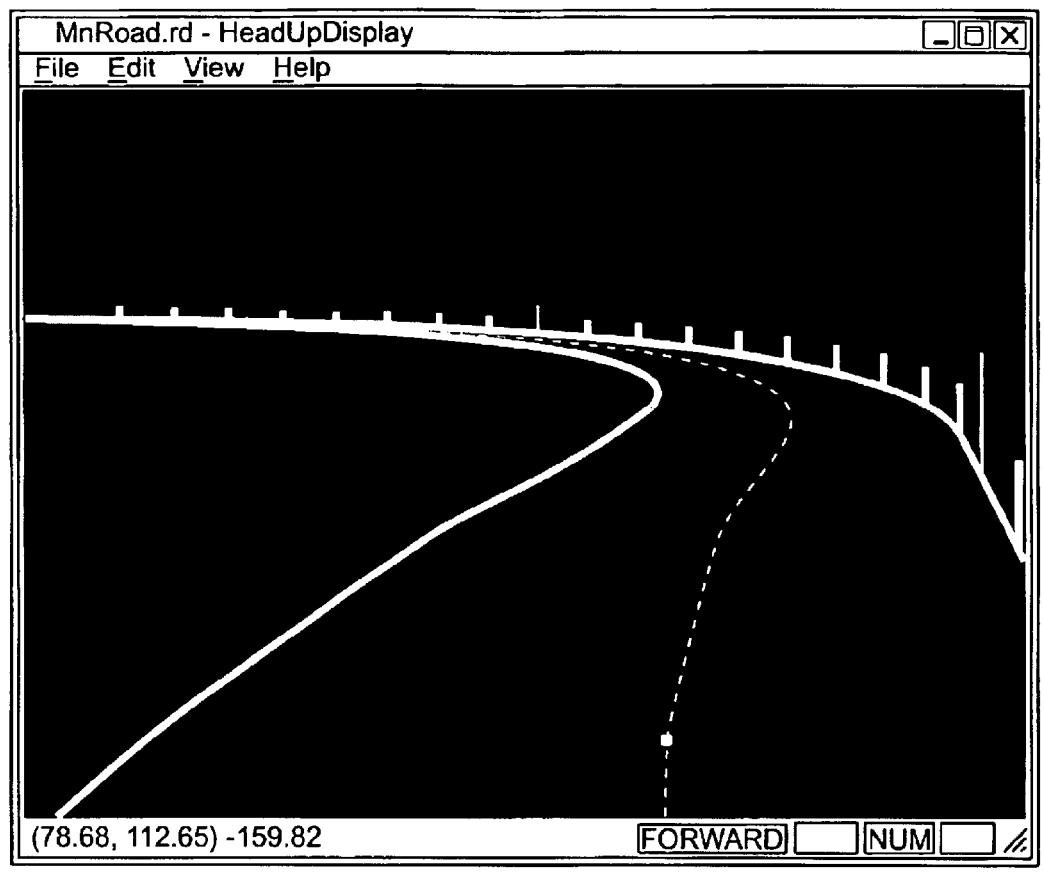
FIG._3D
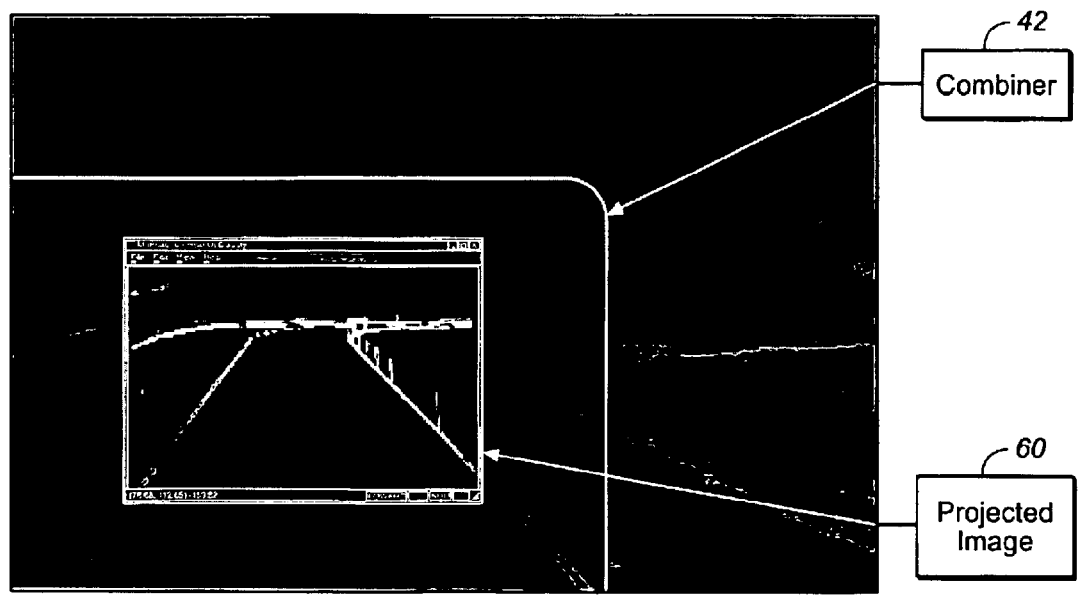
FIG._3E

FIG._3F
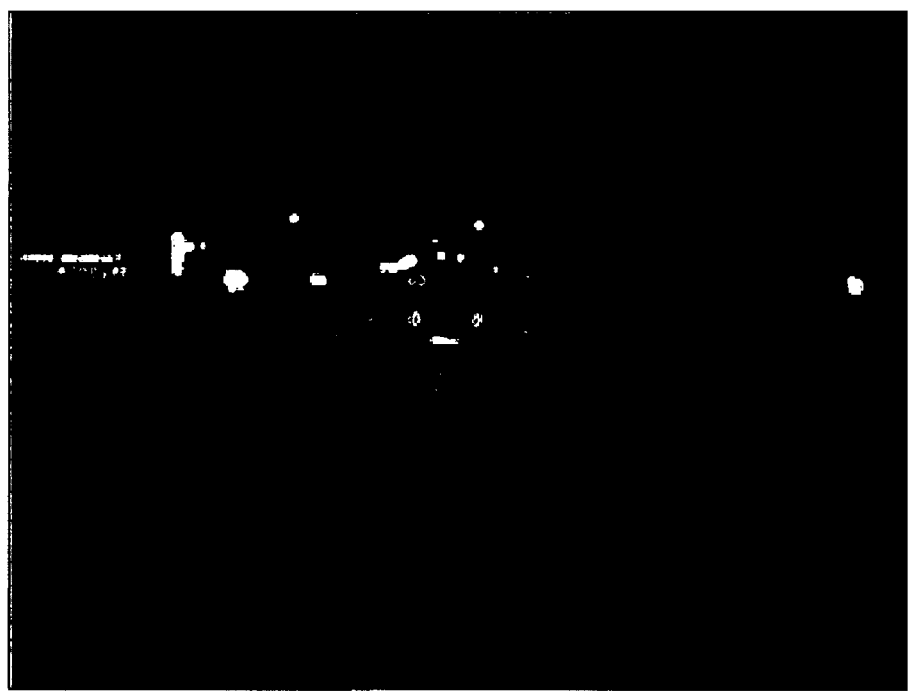
FIG._3G

FIG._3H
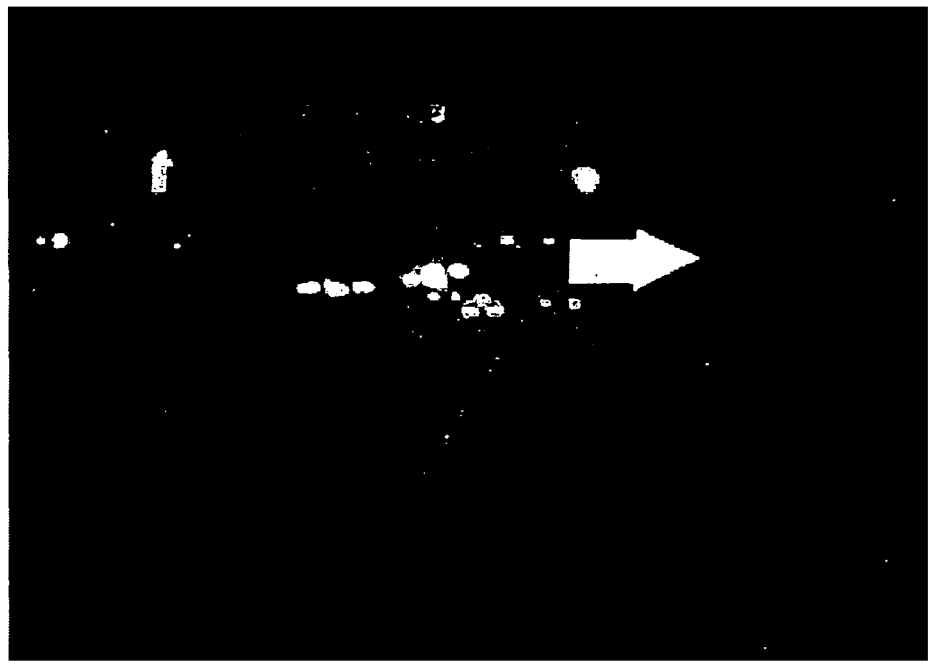
FIG._3I

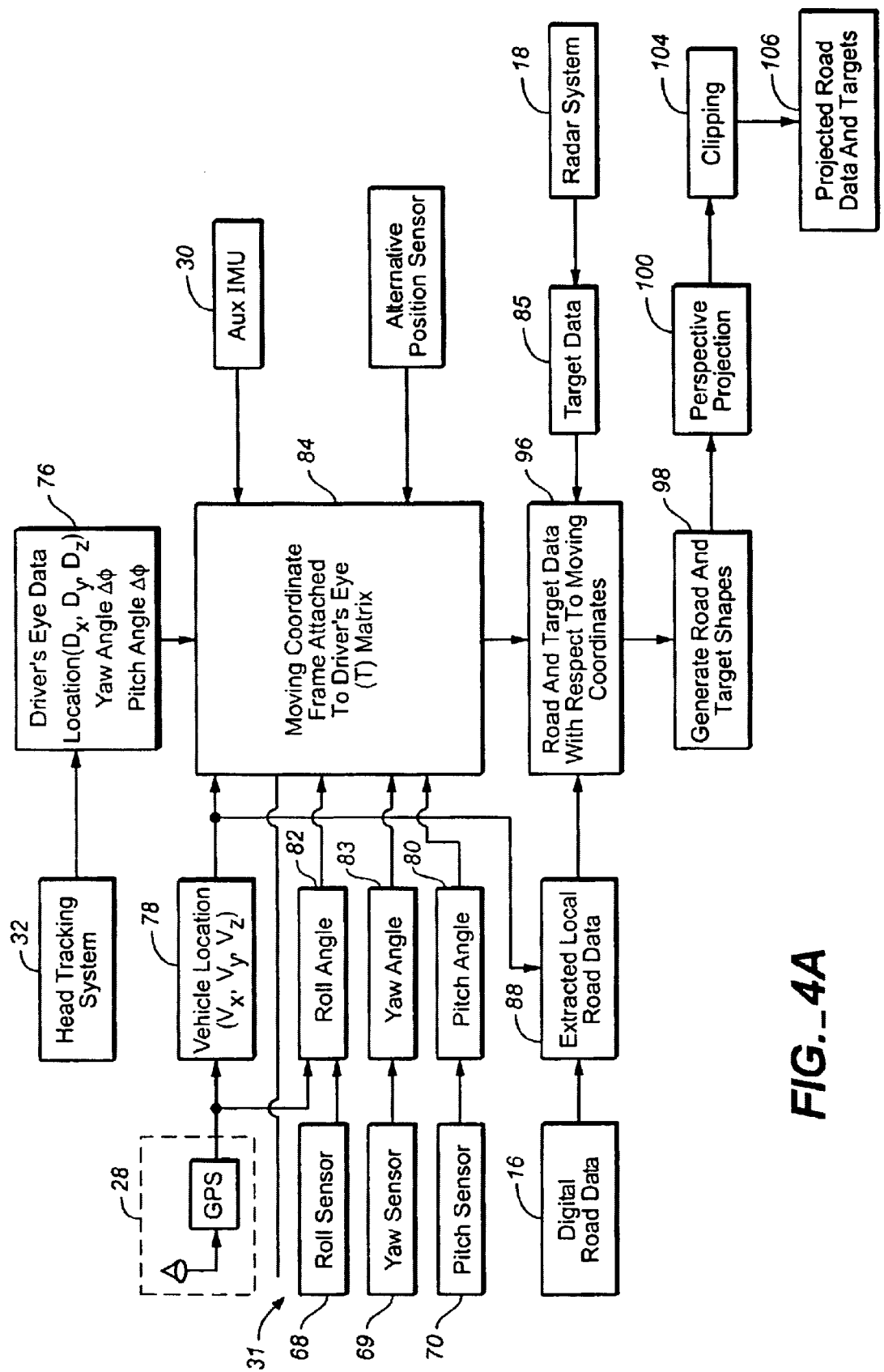
FIG._4A

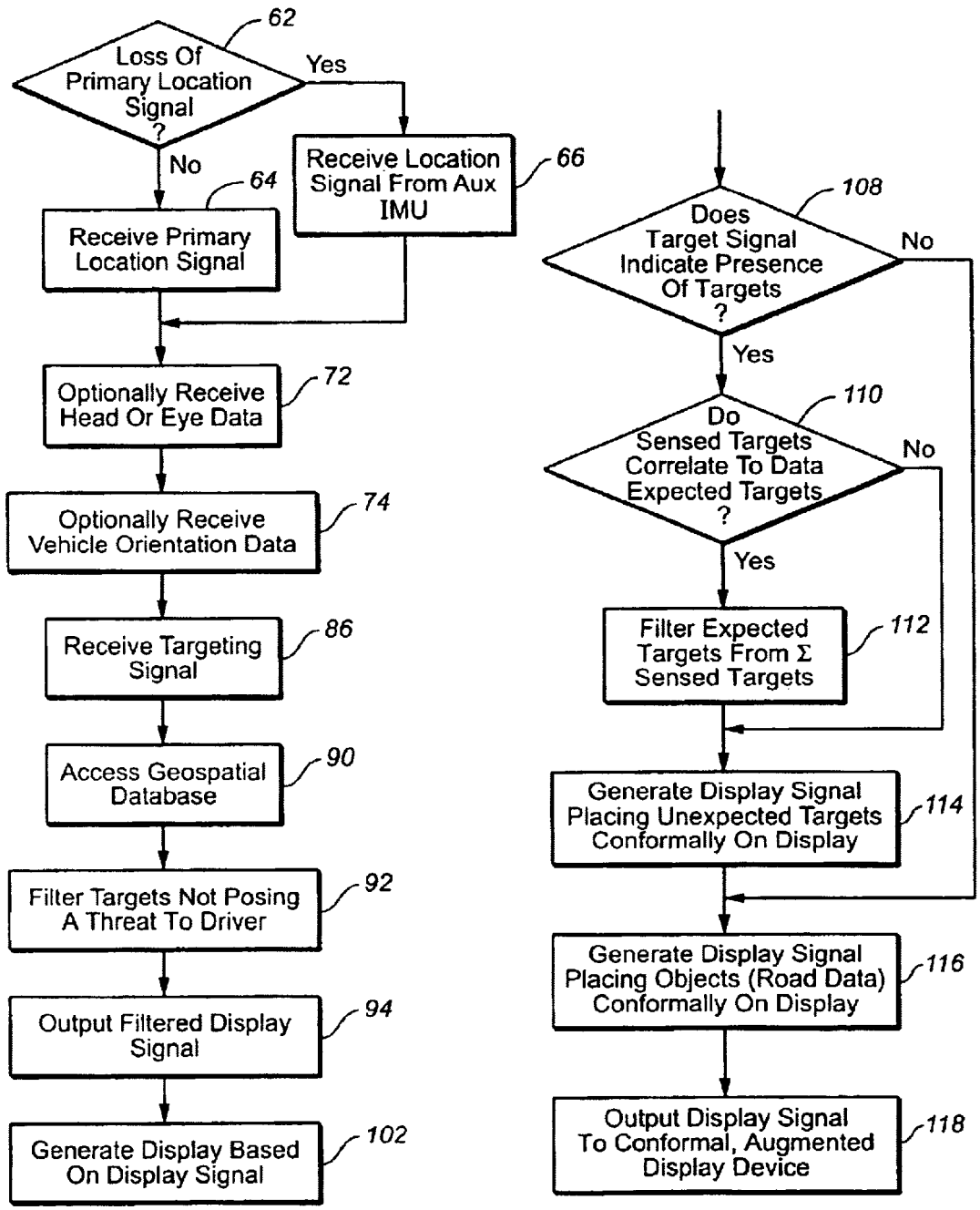
FIG._4B     FIG._4C

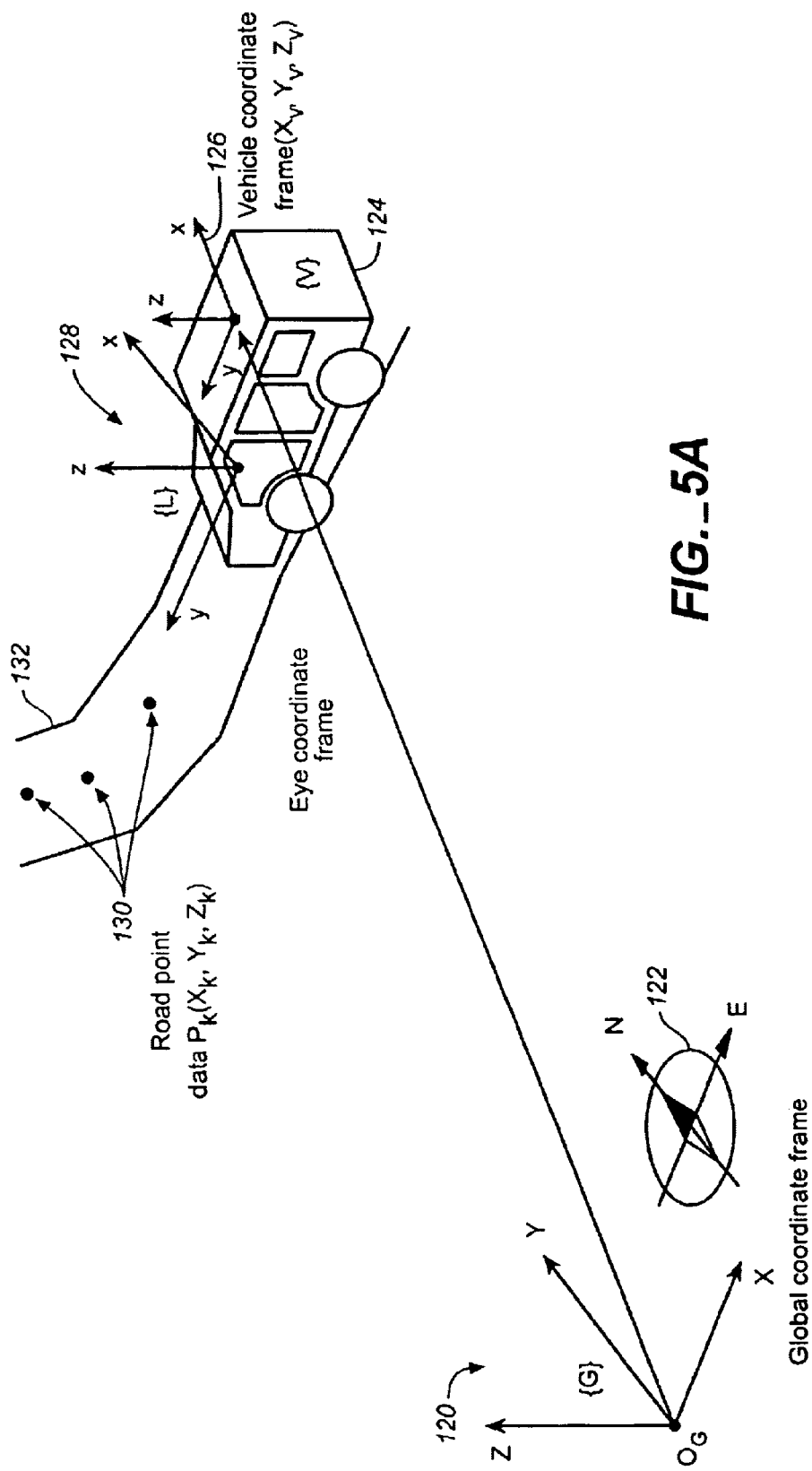
FIG._5A

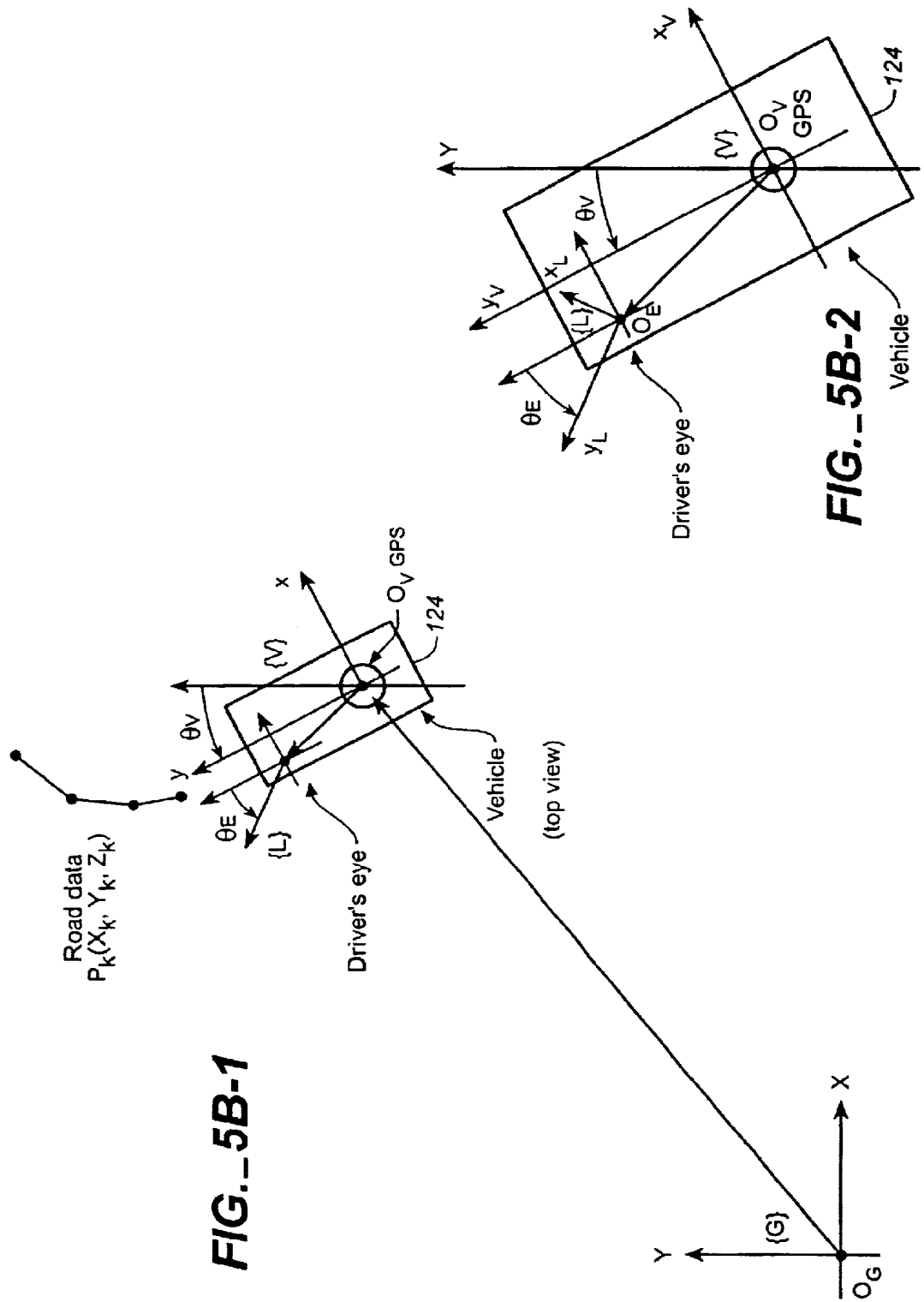

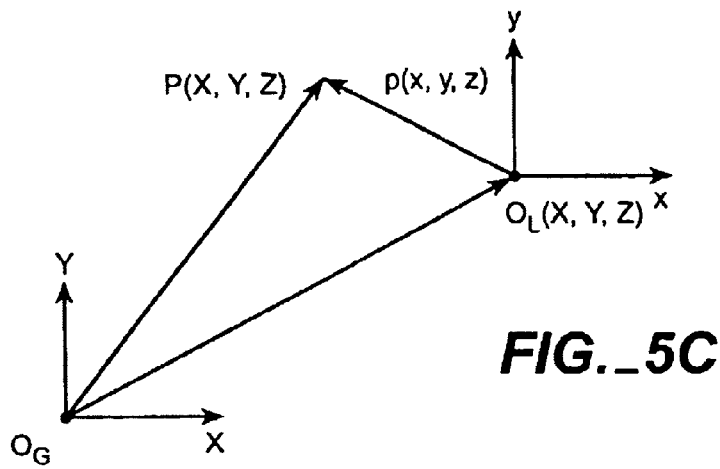
FIG._5C
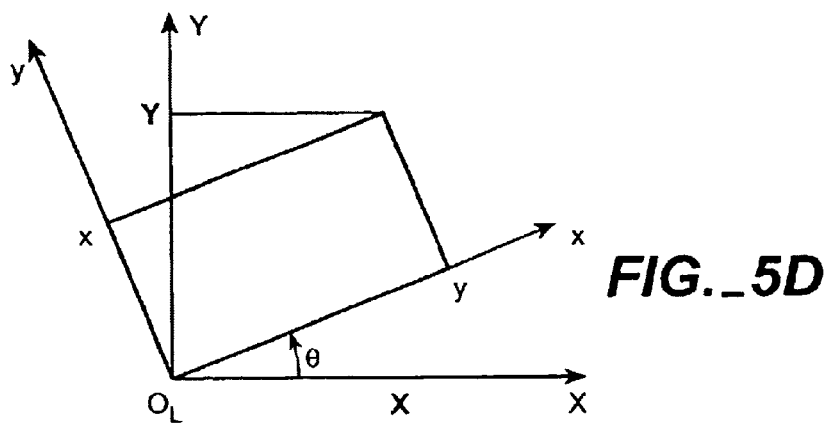
FIG._5D
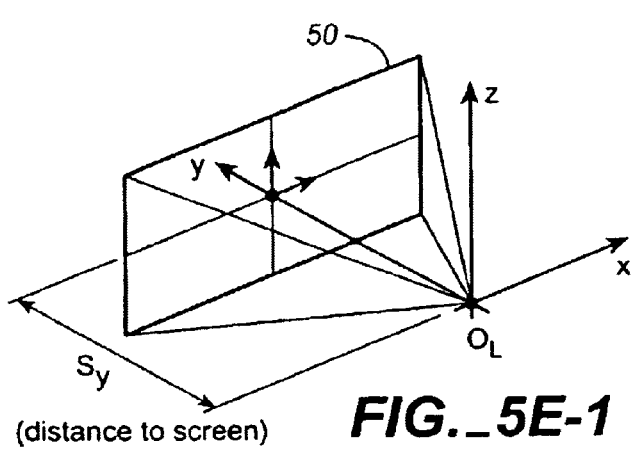
FIG._5E-1
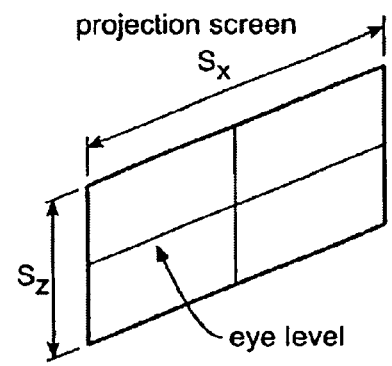
FIG._5E-2

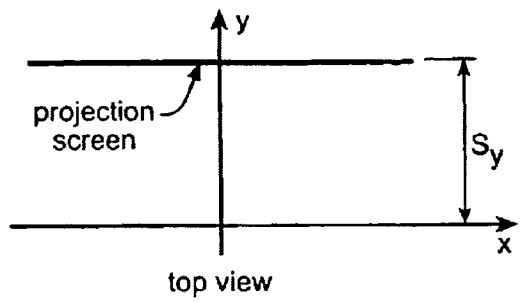
FIG._5F-1
top view
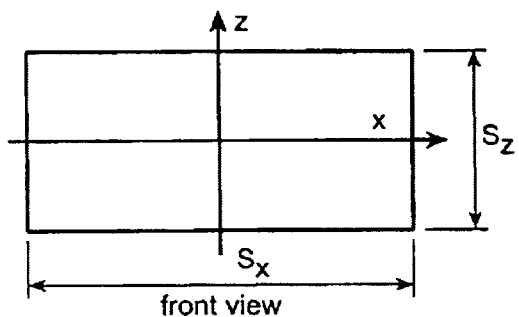
front view
FIG._5F-2
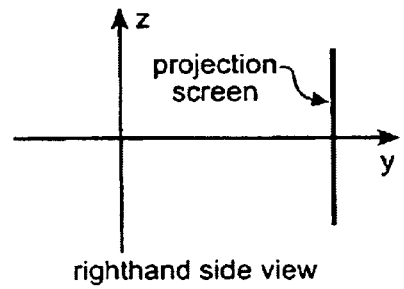
righthand side view
FIG._5F-3
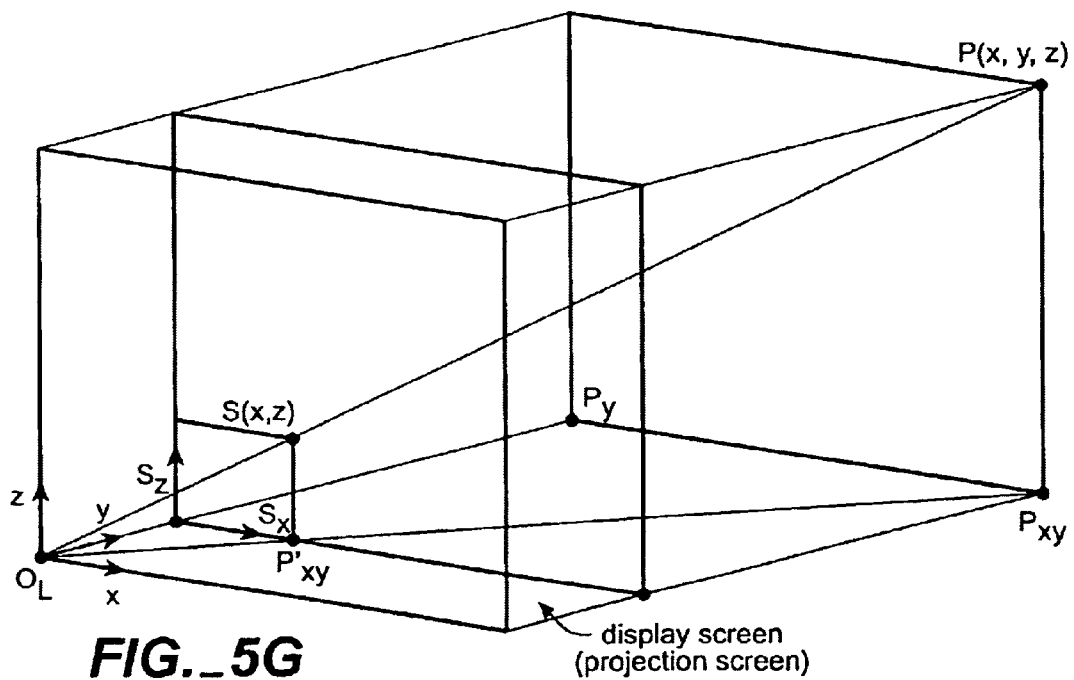
FIG._5G

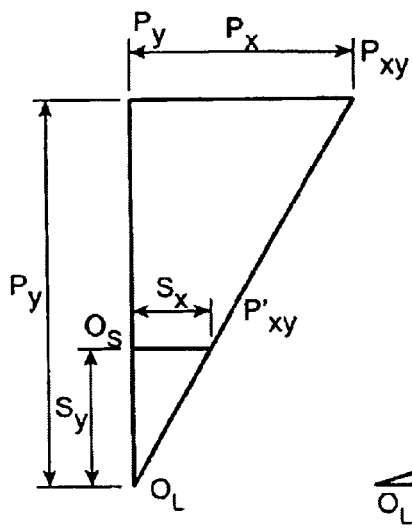
FIG._5H-1
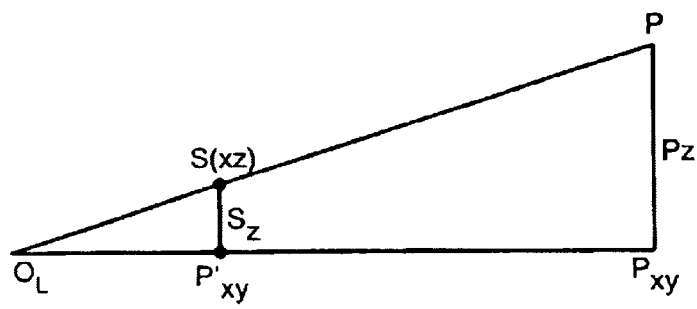
FIG._5H-2
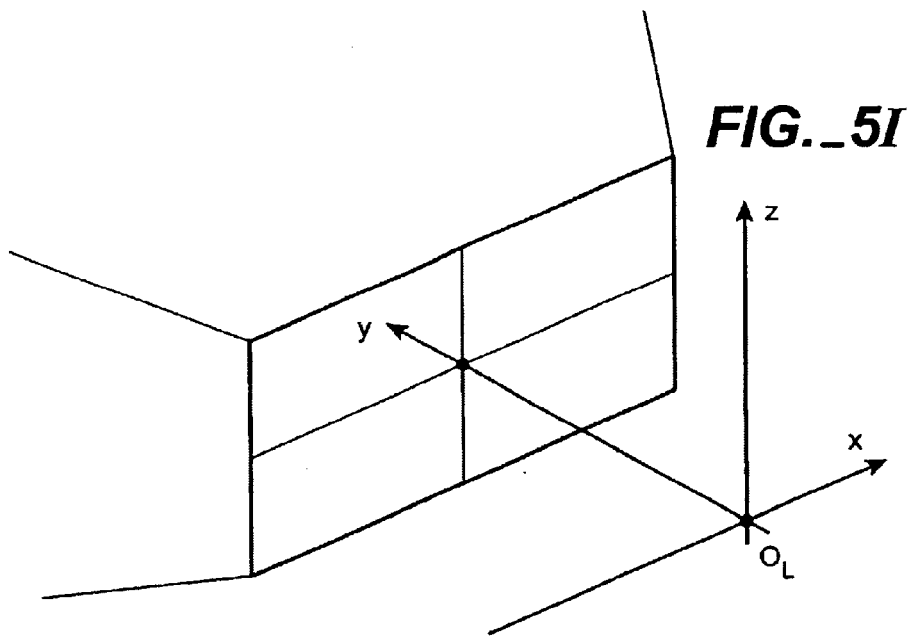
FIG._5I

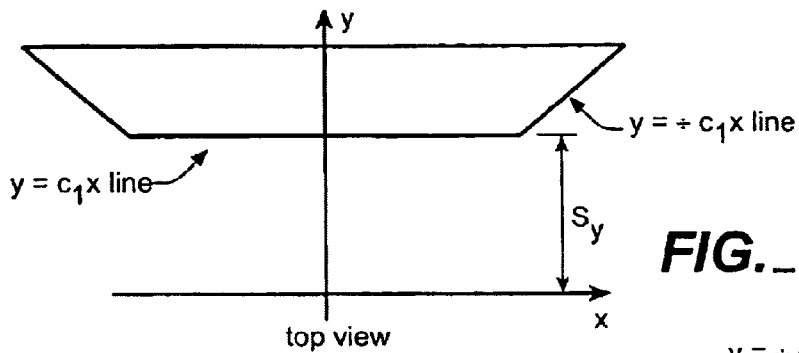
*FIG._5J-1*
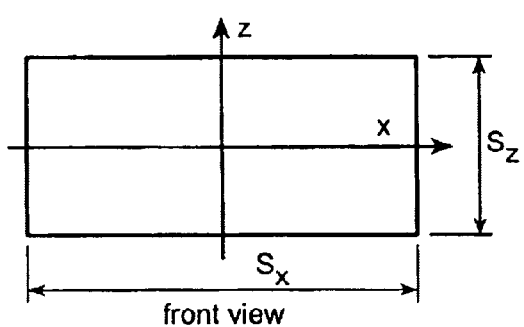
*FIG._5J-2*
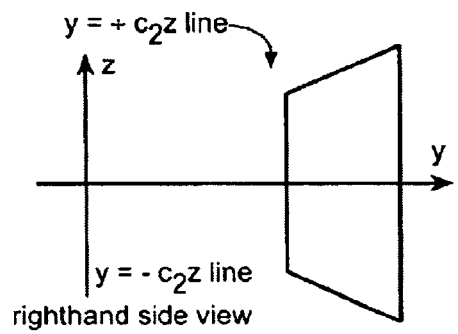
*FIG._5J-3*
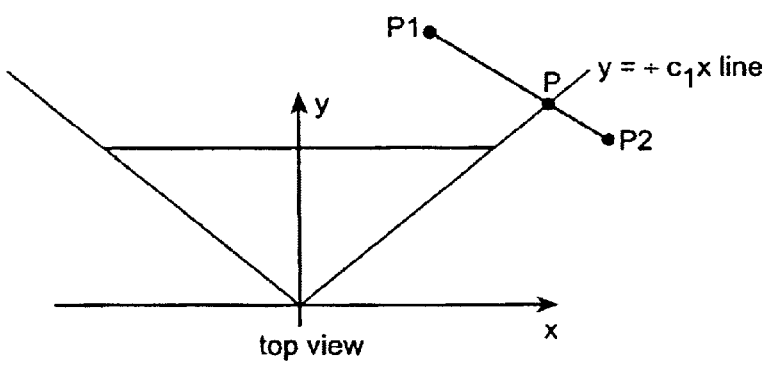
*FIG._5K-1*
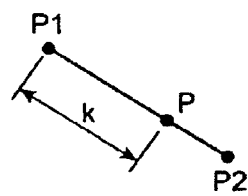
*FIG._5K-3*
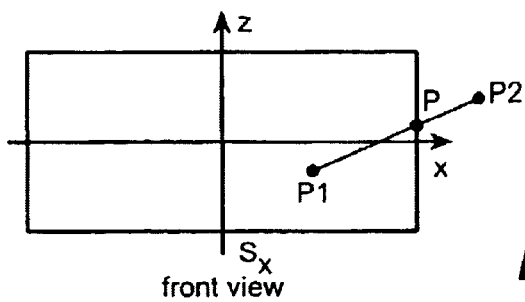
*FIG._5K-2*

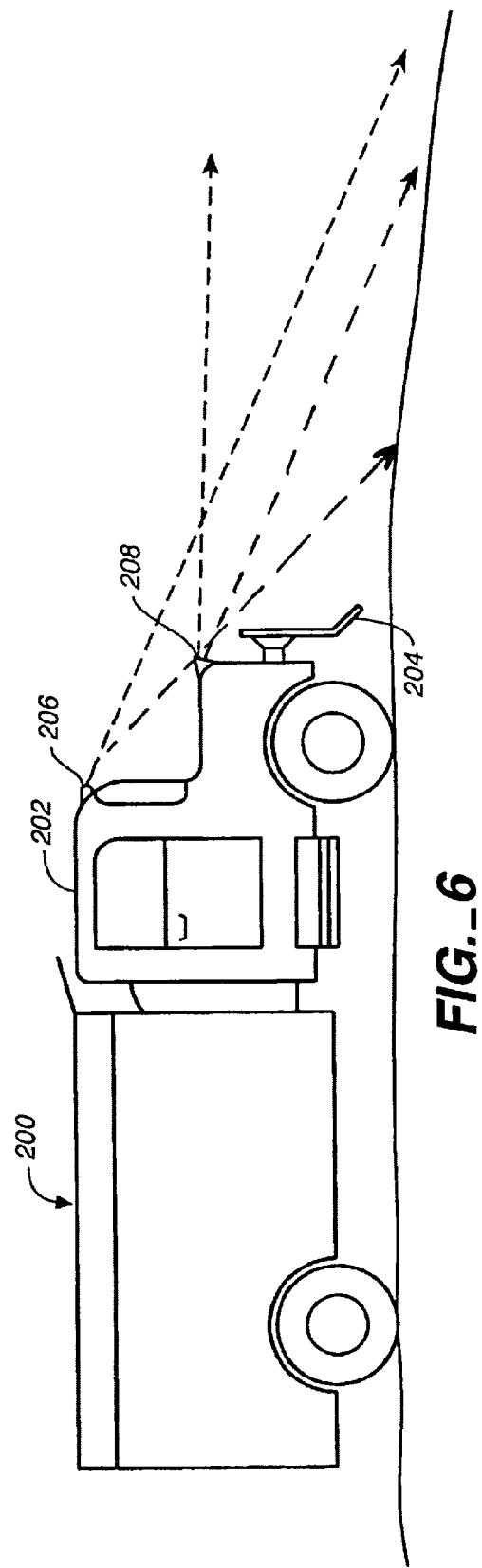

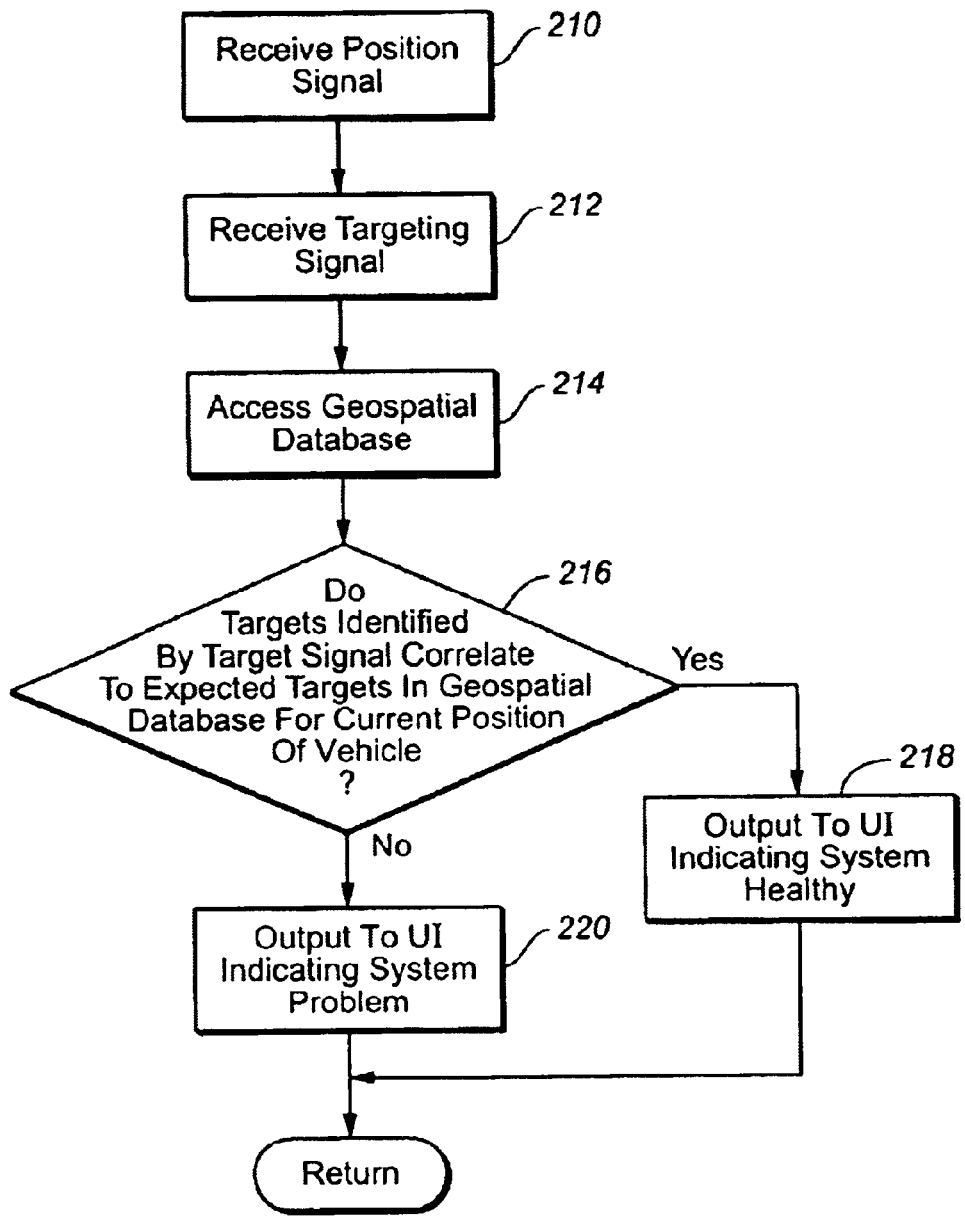
FIG._7

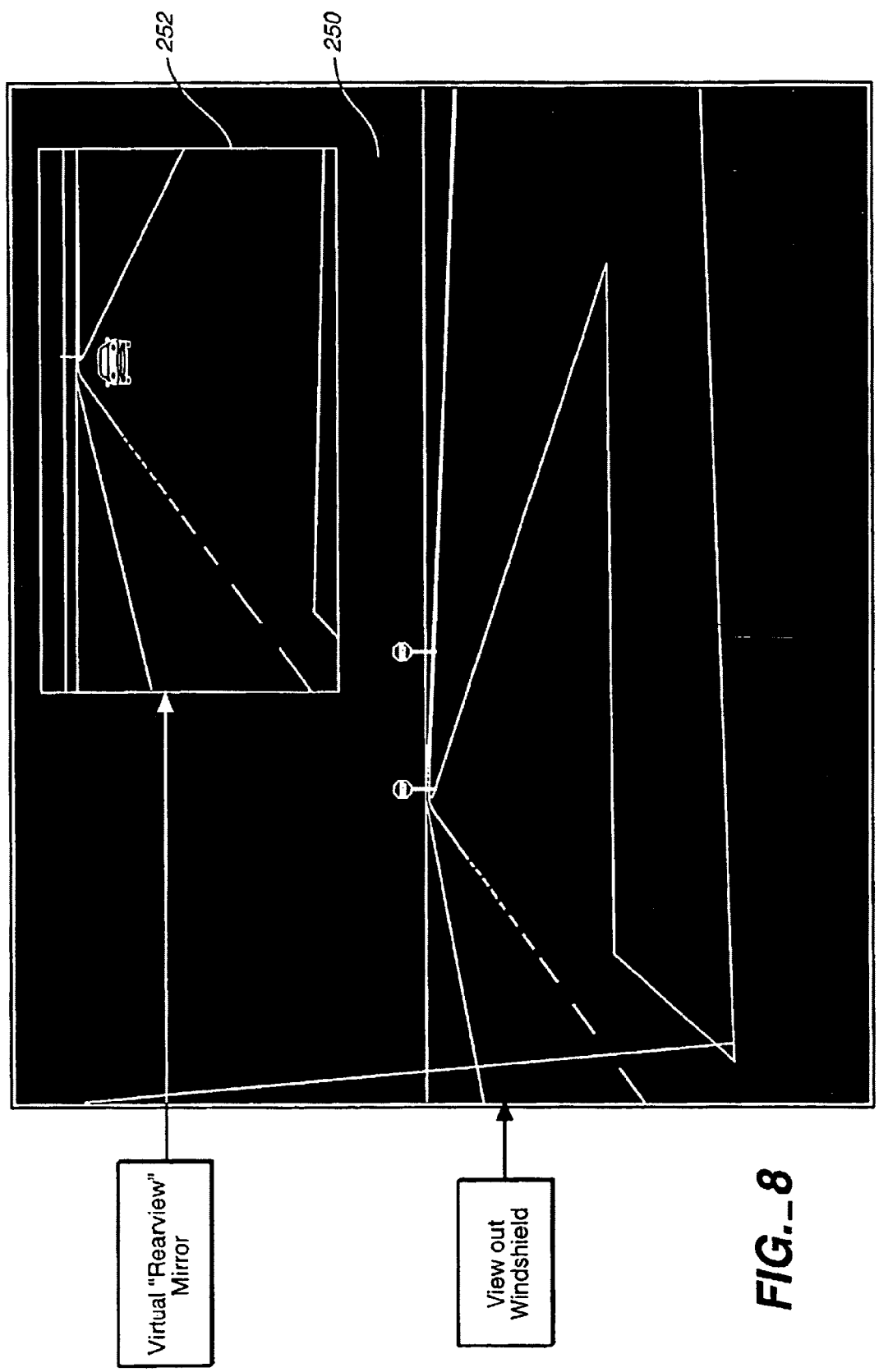
FIG._8

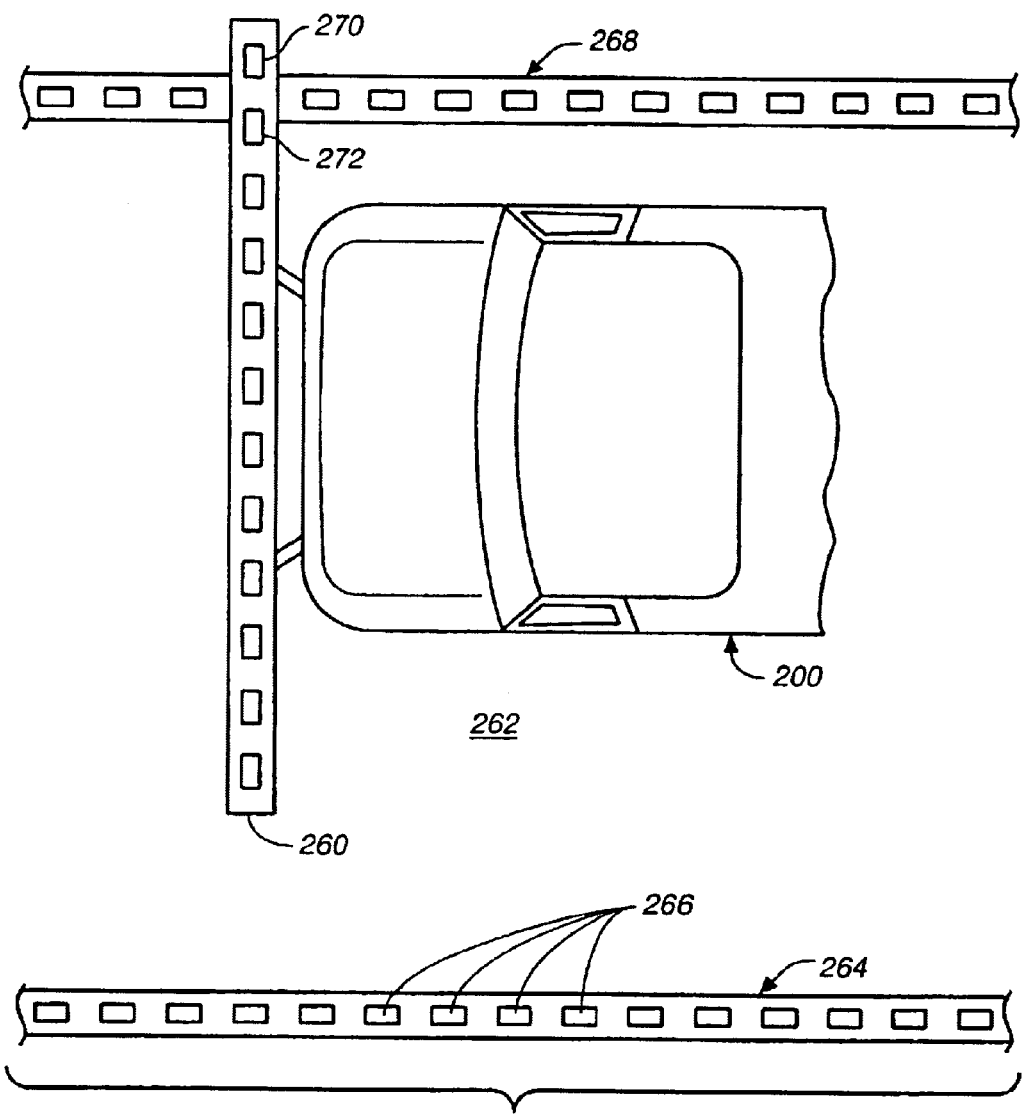
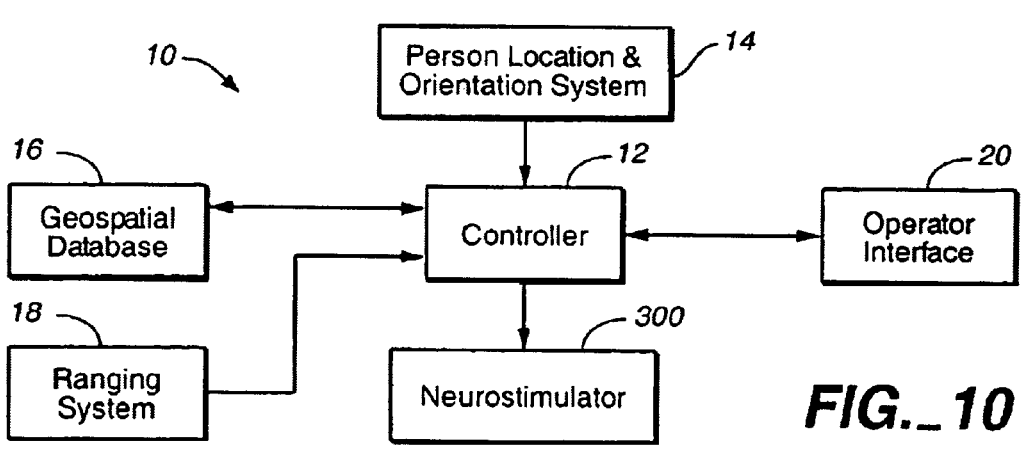
FIG._9
FIG._10

MOBILITY ASSIST DEVICE

BACKGROUND OF THE INVENTION

The present invention deals with mobility assistance. More particularly, the present invention deals with a vision assist device in the form of a head up display (HUD) for assisting mobility of a mobile body, such as a person, non-motorized vehicle or motor vehicle.

Driving a motor vehicle on the road, with a modicum of safety, can be accomplished if two different aspects of driving are maintained. The first is referred to as "collision avoidance" which means maintaining motion of a vehicle without colliding with other obstacles. The second aspect in maintaining safe driving conditions is referred to as "lane keeping" which means maintaining forward motion of a vehicle without erroneously departing from a given driving lane.

Drivers accomplish collision avoidance and lane keeping by continuously controlling vehicle speed, lateral position and heading direction by adjusting the acceleration and brake pedals, as well as the steering wheel. The ability to adequately maintain both collision avoidance and lane keeping is greatly compromised when the forward-looking visual field of a driver is obstructed. In fact, many researchers have concluded that the driver's ability to perceive the forward-looking visual field is the most essential input for the task of driving.

There are many different conditions which can obstruct (to varying degrees) the forward-looking visual field of a driver. For example, heavy snowfall, heavy rain, fog, smoke, darkness, blowing dust or sand, or any other substance or mechanism which obstructs (either partially or fully) the forward-looking visual field of a driver makes it difficult to identify obstacles and road boundaries which, in turn, compromises collision avoidance and lane keeping. Similarly, even on sunny, or otherwise clear days, blowing snow or complete coverage of the road by snow, may result in a loss of visual perception of the road. Such "white out" conditions are often encountered by snowplows working on highways, due to the nature of their task. The driver's forward-looking vision simply does not provide enough information to facilitate safe control of the vehicle. This can be exacerbated, particularly on snow removal equipment, because even on a relatively calm, clear day, snow can be blown up from the front or sides of snowplow blades, substantially obstructing the visual field of the driver.

Similarly, driving at night in heavy snowfall causes the headlight beams of the vehicle to be reflected into the driver's forward-looking view. Snow flakes glare brightly when they are illuminated at night and make the average brightness level perceived by the driver's eye higher than normal. This higher brightness level causes the iris to adapt to the increased brightness and, as a result, the eye becomes insensitive to the darker objects behind the glaring snowflakes, which are often vital to driving. Such objects can include road boundaries, obstacles, other vehicles, signs, etc.

Research has also been done which indicates that prolonged deprivation of visual stimulation can lead to confusion. For example, scientists believe that one third of human brain neurons are devoted to visual processing. Pilots, who are exposed to an empty visual field for longer than a certain amount of time, such as during high-altitude flight, or flight in thick fog, have a massive number of unstimulated visual neurons. This can lead to control confusion which makes it difficult for the pilot to control the vehicle. A similar condition can occur when attempting to navigate or plow a snowy road during daytime heavy snowfall in a featureless rural environment.

Many other environments are also plagued by poor visibility conditions. For instance, in military or other environments one may be moving through terrain at night, either in a vehicle or on foot, without the assistance of lights. Further, in mining environments or simply when driving on a dirt, sand or gravel surface particulate matter can obstruct vision. In water-going vehicles, it can be difficult to navigate through canals, around rocks, into a port, or through lock and dams because obstacles may be obscured by fog, below the water, or by other weather conditions. Similarly, surveyors may find it difficult to survey land with dense vegetation or rock formations which obstruct vision. People in non-motorized vehicles (such as in wheelchairs, on bicycles, on skis, etc. . . . can find themselves in these environments as well. All such environments, and many others, have visual conditions which act as a hindrance to persons working in, or moving through, those environments.

SUMMARY OF THE INVENTION

The present invention is directed to a visual assist device which provides a conformal, augmented display to assist in movement of a mobile body. In one example, the mobile body is a vehicle (motorized or non-motorized) and the present invention assists the driver in either lane keeping or collision avoidance, or both. The system can display lane boundaries, other navigational or guidance elements or a variety of other objects in proper perspective, to assist the driver. In another example, the mobile body is a person (or group of people) and the present invention assists the person in either staying on a prescribed path or collision avoidance or both. The system can display path boundaries, other navigational or guidance elements or a variety of other objects in proper perspective, to assist the walking person.

BRIEF DESCRIPTION OF THE DRAWINGS

FIG. 1 is a block diagram of a mobility assist device in accordance with one embodiment of the present invention.

FIGS. 2 is a more detailed block diagrams of another embodiment of the mobility assist device.

FIG. 3A is a partial-pictorial and partial block diagram illustrating operation of a mobility assist device in accordance with one embodiment of the present invention.

FIGS. 3C, 3D and 3E are pictorial illustrations of a conformal, augmented projection and display in accordance with one embodiment of the present invention.

FIGS. 3F, 3G, 3H and 3I are pictorial illustrations of an actual conformal, augmented display in accordance with an embodiment of the present invention.

FIGS. 4A–4C are flow diagrams illustrating general operation of the mobility assist device.

FIG. 5A illustrates coordinate frames used in accordance with one embodiment of the present invention.

FIGS. 5B-1 to 5K-3 illustrate the development of a coordinate transformation matrix in accordance with one embodiment of the present invention.

FIG. 6 is a side view of a vehicle employing the ranging system in accordance with one embodiment of the present invention.

FIG. 7 is a flow diagram illustrating a use of the present invention in performing system diagnostics and improved radar processing.

FIG. 8 is a pictorial view of a head up virtual mirror, in accordance with one embodiment of the present invention.

FIG. 9 is a top view of one embodiment of a system used to obtain position information corresponding to a vehicle.

FIG. 10 is a block diagram of another embodiment of the present invention.

DETAILED DESCRIPTION OF THE PREFERRED EMBODIMENTS

Figure 3B:
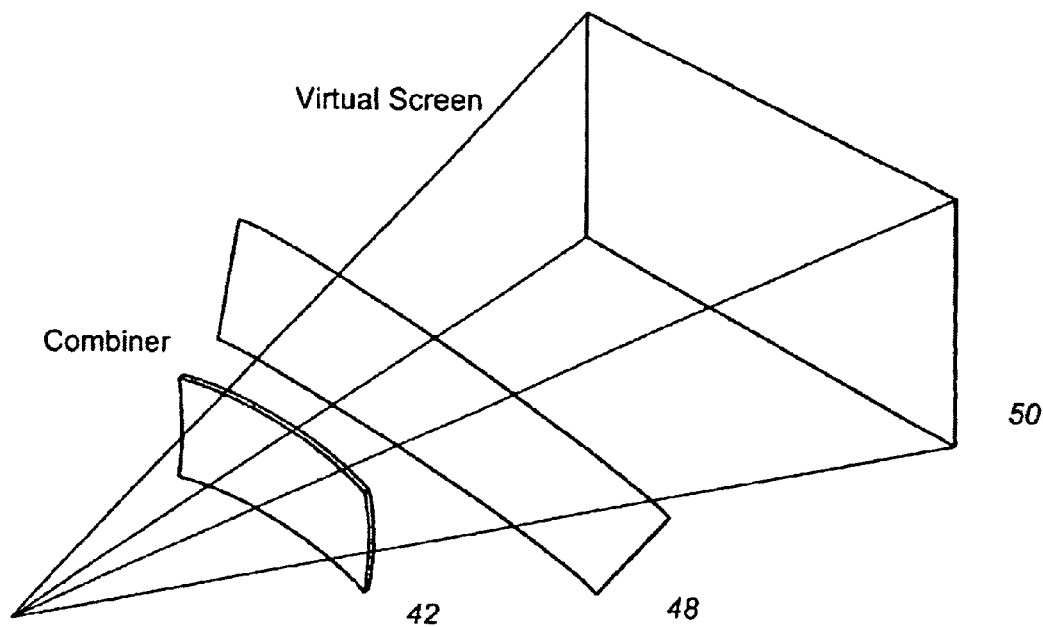
FIG. 3B illustrates the concept of a combiner and virtual screen.

The present invention can be used with substantially any mobile body, such as a human being, a motor vehicle or a non-motorized vehicle. However, the present description proceeds with respect to an illustrative embodiment in which the invention is implemented on a motor vehicle as a driver assist device. FIG. 1 is a simplified block diagram of one embodiment of driver assist device 10 in accordance with the present invention. Driver assist device 10 includes controller 12, vehicle location system 14, geospatial database 16, ranging system 18, operator interface 20 and display 22.

In one embodiment, controller 12 is a microprocessor, microcontroller, digital computer, or other similar control device having associated memory and timing circuitry. It should be understood that the memory can be integrated with controller 12, or be located separately therefrom. The memory, of course, may include random access memory, read only memory, magnetic or optical disc drives, tape memory, or any other suitable computer readable medium.

Operator interface 20 is illustratively a keyboard, a touch-sensitive screen, a point and click user input device (e.g. a mouse), a keypad, a voice activated interface, joystick, or any other type of user interface suitable for receiving user commands, and providing those commands to controller 12, as well as providing a user viewable indication of operating conditions from controller 12 to the user. The operator interface may also include, for example, the steering wheel and the throttle and brake pedals suitably instrumented to detect the operator's desired control inputs of heading angle and speed. Operator interface 20 may also include, for example, a LCD screen, LEDs, a plasma display, a CRT, audible noise generators, or any other suitable operator interface display or speaker unit.

As is described in greater detail later in the specification, vehicle location system 14 determines and provides a vehicle location signal, indicative of the vehicle location in which driver assist device 10 is mounted, to controller 12. Thus, vehicle location system 14 can include a global positioning system receiver (GPS receiver) such as a differential GPS receiver, an earth reference position measuring system, a dead reckoning system (such as odometery and an electronic compass), an inertial measurement unit (such as accelerometers, inclinometers, or rate gyroscopes), etc. In any case, vehicle location system 14 periodically provides a location signal to controller 12 which indicates the location of the vehicle on the surface of the earth.

Geospatial database 16 contains a digital map which digitally locates road boundaries, lane boundaries, possibly some landmarks (such as road signs, water towers, or other landmarks) and any other desired items (such as road barriers, bridges etc. . . . ) and describes a precise location and attributes of those items on the surface of the earth.

It should be noted that there are many possible coordinate systems that can be used to express a location on the surface of the earth, but the most common coordinate frames include longitudinal and latitudinal angle, state coordinate frame, and county coordinate frame.

Because the earth is approximately spherical in shape, it is convenient to determine a location on the surface of the earth if the location values are expressed in terms of an angle from a reference point. Longitude and latitude are the most commonly used angles to express a location on the earth's surface or in orbits around the earth. Latitude is a measurement on a globe of location north or south of the equator, and longitude is a measurement of the location east or west of the prime meridian at Greenwich, the specifically designated imaginary north-south line that passes through both geographic poles of the earth and Greenwich, England. The combinations of meridians of longitude and parallels of latitude establishes a framework or grid by means of which exact positions can be determined in reference to the prime meridian and the equator. Many of the currently available GPS systems provide latitude and longitude values as location data.

Even though the actual landscape on the earth is a curved surface, it is recognized that land is utilized as if it is a flat surface. A Cartesian coordinate system whose axes are defined as three perpendicular vectors is usually used. Each state has its own standard coordinate system to locate points within their state boundaries. All construction and measurements are done using distance dimensions (such as meters or feet). Therefore, a curved surface on the earth needs to be converted into a flat surface and this conversion is referred to as a projection. There are many projection methods used as standards for various local areas on the earth's surface. Every projection involves some degree of distortion due to the fact that a surface of a sphere is constrained to be mapped onto a plane.

One standard projection method is the Lambert Conformal Conic Projection Method. This projection method is extensively used in a ellipsoidal form for large scale mapping of regions of predominantly east-west extent, including topographic, quadrangles for many of the U.S. state plane coordinate system zones, maps in the International Map of the World series and the U.S. State Base maps. The method uses well known, and publicly available, conversion equations to calculate state coordinate values from GPS receiver longitude and latitude angle data.

The digital map stored in the geospatial database 16 contains a series of numeric location data of, for example, the center line and lane boundaries of a road on which system 10 is to be used, as well as construction data which is given by a number of shape parameters including, starting and ending points of straight paths, the center of circular sections, and starting and ending angles of circular sections. While the present system is described herein in terms of starting and ending points of circular sections it could be described in terms of starting and ending points and any curvature between those points. For example, a straight path can be characterized as a section of zero curvature. Each of these items is indicated by a parameter marker, which indicates the type of parameter it is, and has associated location data giving the precise geographic location of that point on the map.

In one embodiment, each road point of the digital map in database 16 was generated at uniform 10 meter intervals. In one embodiment, the road points represent only the centerline of the road, and the lane boundaries are calculated from that centerline point. In another embodiment, both the center line and lane boundaries are mapped. Of course, geospatial database 16 also illustratively contains the exact location data indicative of the exact geographical location of street signs and other desirable landmarks. Database 16 can be obtained by manual mapping operations or by a number of automated methods such as, for example, placing a GPS receiver on the lane stripe paint spraying nozzle or tape laying mandrel to continuously obtain locations of lane boundaries.

Ranging system 18 is configured to detect targets in the vicinity of the vehicle in which system 10 is implemented, and also to detect a location (such as range, range rate and azimuth angle) of the detected targets, relative to the vehicle. Targets are illustratively objects which must be monitored because they may collide with the mobile body either due to motion of the body or of the object. In one illustrative embodiment, ranging system 18 is a radar system commercially available from Eaton Vorad. However, ranging system 18 can also include a passive or active infrared system (which could also provide the amount of heat emitted from the target) or laser based ranging system, or a directional ultrasonic system, or other similar systems. Another embodiment of system 18 is an infrared sensor calibrated to obtain a scaling factor for range, range rate and azimuth which is used for transformation to an eye coordinate system.

Display 22 includes a projection unit and one or more combiners which are described in greater detail later in the specification. Briefly, the projection unit receives a video signal from controller 12 and projects video images onto one or more combiners. The projection unit illustratively includes a liquid crystal display (LCD) matrix and a high-intensity light source similar to a conventional video projector, except that it is small so that it fits near the driver's seat space. The combiner is a partially-reflective, partially transmissive beam splitter formed of optical glass or polymer for reflecting the projected light from the projection unit back to the driver. In one embodiment, the combiner is positioned such that the driver looks through the combiner, when looking through the forward-looking visual field, so that the driver can see both the actual outside road scene, as well as the computer generated images projected onto the combiner. In one illustrative embodiment, the computer-generated images substantially overlay the actual images.

It should also be noted, however, that combiners or other similar devices can be placed about the driver to cover substantially all fields of view or be implemented in the glass of the windshield and windows. This can illustratively be implemented using a plurality of projectors or a single projector with appropriate optics to scan the projected image across the appropriate fields of view.

Before discussing the operation of system 10 in greater detail, it is worth pointing out that system 10 can also, in one illustrative embodiment, be varied, as desired. For example, FIG. 2 illustrates that controller 12 may actually be formed of first controller 24 and second controller 26 (or any number of controllers with processing distributed among them, as desired). In that embodiment, first controller 24 performs the primary data processing functions with respect to sensory data acquisition, and also performs database queries in the geospatial database 16. This entails obtaining velocity and heading information from GPS receiver and correction system 28. First controller 24 also performs processing of the target signal from radar ranging system 18.

FIG. 2 also illustrates that vehicle location system 14 may illustratively include a differential GPS receiver and correction system 28 as well as an auxiliary inertial measurement unit (IMU) 30 (although other approaches would also work).

Second controller 26 processes signals from auxiliary IMU 30, where necessary, and handles graphics computations for providing the appropriate video signal to display 22.

In a specific illustrative embodiment, differential GPS receiver and correcting system 28 is illustratively a Novatel RT-20 differential GPS (DGPS) system with a 20-centimeter accuracy, while operating at a 5 Hz sampling rate or Trimble MS 750 with 2 cm accuracy operating at 10 Hz sampling rate.

FIG. 2 also illustrates that system 10 can include optional vehicle orientation detection system 31 and optional head tracking system 32. Vehicle orientation detection system 31 detects the orientation (such as roll and pitch) of the vehicle in which system 10 is implemented. The roll angle refers to the rotational orientation of the vehicle about its longitudinal axis (which is parallel to its direction of travel). The roll angle can change, for example, if the vehicle is driving over a banked road, or on uneven terrain. The pitch angle is the angle that the vehicle makes in a vertical plane along the longitudinal direction. The pitch angle becomes significant if the vehicle is climbing up or descending down a hill. Taking into account the pitch and roll angles can make the projected image more accurate, and more closely conform to the actual image seen by the driver.

Optional head tracking system 32 can be provided to accommodate for movements in the driver's head or eye position relative to the vehicle. Of course, in one illustrative embodiment, the actual head and eye position of the driver is not monitored. Instead, the dimensions of the cab or operator compartment of the vehicle in which system 10 is implemented are taken and used, along with ergonomic data, such as the height and eye position of an operator, given the dimension of the operator compartment, and the image is projected on display 22 such that the displayed images will substantially overlie the actual images for an average operator. Specific measurements can be taken for any given operator as well, such that such a system can more closely conform to any given operator.

Alternatively, optional head tracking system 32 is provided. Head tracking system 32 tracks the position of the operator's head, and eyes, in real time.

FIGS. 3A–3E better illustrate the display of information on display 22. FIG. 3A illustrates that display 22 includes projector 40, and combiner 42. FIG. 3A also illustrates an operator 44 sitting in an operator compartment which includes seat 46 and which is partially defined by windshield 48.

Projector 40 receives the video display signal from controller 12 and projects road data onto combiner 42. Combiner 42 is partially reflective and partially transmissive. Therefore, the operator looks forward through combiner 42 and windshield 48 to a virtual focal plane 50. The road data (such as lane boundaries) are projected from projector 40 in proper perspective onto combiner 42 such that the lane boundaries appear to substantially overlie those which the operator actually sees, in the correct perspective. In this way, when the operator's view of the actual lane boundaries becomes obstructed, the operator can safely maintain lane keeping because the operator can navigate by the projected lane boundaries.

FIG. 3A also illustrates that combiner 42, in one illustrative embodiment, is hinged to an upper surface or side surface or other structural part 52, of the operator compartment. Therefore, combiner 42 can be pivoted along an arc generally indicated by arrow 54, up and out of the view of the operator, on days when no driver assistance is needed, and down to the position shown in FIG. 3A, when the operator desires to look through combiner 42.

FIG. 3B better illustrates combiner 42, window 48 and virtual screen or focal plane 50. Combiner 42, while being partially reflective, is essentially a transparent, optically correct, coated glass or polymer lens. Light reaching the eyes of operator 44 is a combination of light passing through the lens and light reflected off of the lens from the projector. With an unobstructed forward-looking visual field, the driver actually sees two images accurately superimposed together. The image passing through the combiner 42 comes from the actual forward-looking field of view, while the reflected image is generated by the graphics processor portion of controller 12. The optical characteristics of combiner 42 allow the combination of elements to generate the virtual screen, or virtual focal plane 50, which is illustratively projected to appear approximately 30–80 feet ahead of combiner 42. This feature results in a virtual focus in front of the vehicle, and ensures that the driver's eyes are not required to focus back and forth between the real image and the virtual image, thus reducing eyestrain and fatigue.

In one illustrative embodiment, combiner 42 is formed such that the visual image size spans approximately 30° along a horizontal axis and 15° along a vertical axis with the projector located approximately 18 inches from the combiner.

Another embodiment is a helmet supported visor (or eyeglass device) on which images are projected, through which the driver can still see. Such displays might include technologies such as those available from Kaiser Electro-Optics, Inc. of Carlsbad, Calif., The MicroOptical Corporation of Westwood, Mass., Universal Display Corporation of Ewing, N.J., Microvision, Inc. of Bothell, Wa. and IODisplay System LLC of Menlo Park, Calif.

Figure 3C:
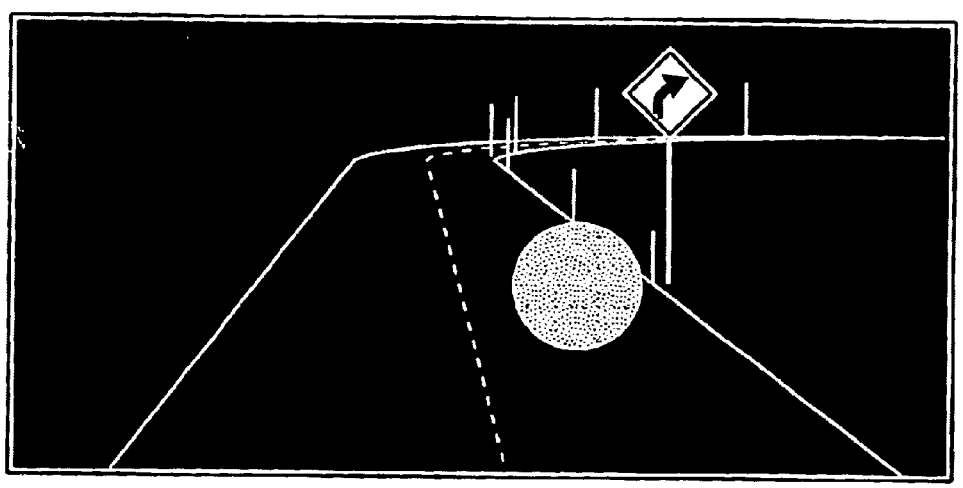

FIGS. 3C and 3D are illustrative displays from projector 40 which are projected onto combiner 42. In FIGS. 3C and 3D, the left most line is the left side road boundary. The dotted line corresponds to the centerline of a two-way road, while the right most curved line, with vertical poles, corresponds to the right-hand side road boundary. The gray circle near the center of the image shown in FIG. 3C corresponds to a target detected and located by ranging system 18 described in greater detail later in the application. Of course, the gray shape need not be a circle but could be any icon or shape and could be transparent, opaque or translucent.

The screens illustrated in FIGS. 3C and 3D can illustratively be projected in the forward-looking visual field of the driver by projecting them onto combiner 42 with the correct scale so that objects (including the painted line stripes and road boundaries) in the screen are superimposed on the actual objects in the outer scene observed by the driver. The black area on the screens illustrated in FIGS. 3C and 3D appear transparent on combiner 42 under typical operating conditions. Only the brightly colored lines appear on the virtual image that is projected onto combiner 42. While the thickness and colors of the road boundaries illustrated in FIGS. 3C and 3D can be varied, as desired, they are illustratively white lines that are approximately 1–5 pixels thick while the center line is also white and is approximately 1–5 pixels thick as well.

FIG. 3E illustrates a virtual image projected onto an actual image as seen through combiner 42 by the driver. The outline of combiner 42 can be seen in the illustration of FIG. 3E and the area 60 which includes the projected image has been outlined in FIG. 3E for the sake of clarity, although no such outline actually appears on the display. It can be seen that the display generated is a conformal, augmented display which is highly useful in low-visibility situations. Geographic landmarks are projected onto combiner 42 and are aligned with the view out of the windshield. Fixed roadside signs (i.e., traditional speed limit signs, exit information signs, etc.) can be projected onto the display, and if desired virtually aligned with actual road signs found in the geospatial landscape. Data supporting fixed signage and other fixed items projected onto the display are retrieved from geospatial database 16.

FIGS. 3F–3H are pictorial illustrations of actual displays. FIG. 3F illustrates two vehicles in close proximity to the vehicle on which system 10 is deployed. It can be seen that the two vehicles have been detected by ranging system 18 (discussed in greater detail below) and have icons projected thereover. FIG. 3G illustrates a vehicle more distant than those in FIG. 3F. FIG. 3G also shows line boundaries which are projected over the actual boundaries. FIG. 3H shows even more distant vehicles and also illustrates objects around an intersection. For example, right turn lane markers are shown displayed over the actual lane boundaries.

The presence and condition of variable road signs (such as stoplights, caution lights, railroad crossing warnings, etc.) can also be incorporated into the display. In that instance, processor 12 determines, based on access to the geospatial database, that a variable sign is within the normal viewing distance of the vehicle. At the same time, a radio frequency (RF) receiver (for instance) which is mounted on the vehicle decodes the signal being broadcast from the variable sign, and provides that information to processor 12. Processor 12 then proceeds to project the variable sign information to the driver on the projector. Of course, this can take any desirable form. For instance, a stop light with a currently red light can be projected, such that it overlies the actual stoplight and such that the red light is highly visible to the driver. Other suitable information and display items can be implemented as well.

For instance, text of signs or road markers can be enlarged to assist drivers with poor night vision. Items outside the driver's field of view can be displayed (e.g., at the top or sides of the display) to give the driver information about objects out of view. Such items can be fixed or transitionary objects or in the nature of advertising such as goods or services available in the vicinity of the vehicle. Such information can be included in the geospatial database and selectively retrieved based on vehicle position.

Directional signs can also be incorporated into the display to guide the driver to a destination (such as a rest area or hotel), as shown in FIG. 3I. It can be seen that the directional arrows are superimposed directly over the lane.

It should be noted that database 16 can be stored locally on the vehicle or queried remotely. Also, database 16 can be periodically updated (either remotely or directly) with a wide variety of information such as detour or road construction information or any other desired information.

The presence and location of transitory obstacles (also referred to herein as unexpected targets) such as stalled cars, moving cars, pedestrians, etc. are also illustratively projected onto combiner 42 with proper perspective such that they substantially overlie the actual obstacles. Transitory obstacle information indicative of such transitory targets or obstacles is derived from ranging system 18. Transitory obstacles are distinguished from conventional roadside obstacles (such as road signs, etc.) by processor 12. Processor 12 senses an obstacle from the signal provided by ranging system 18. Processor 12, then during its query of geospatial database 16, determines whether the target indicated by ranging system 18 actually corresponds to a conventional, expected roadside obstacle which has been mapped into database 16. If not, it is construed as a transitory obstacle, and projected, as a predetermined geometric shape, or bit map, or other icon, in its proper perspective, on combiner 42. The transitory targets basically represent items which are not in a fixed location during normal operating conditions on the roadway.

Of course, other objects can be displayed as well. Such objects can include water towers, trees, bridges, road dividers, other landmarks, etc. . . . Such indicators can also be warnings local speed limits or alarms such as not to turn the wrong way on a one-way road or an off ramp, that the vehicle is approaching an intersection or work zone at too high a high rate of speed. Further, where the combiner is equipped with an LCD film or embedded layer, it can perform other tasks as well. Such tasks can include the display of blocking templates which block out or reduce glare from the sun or headlights from other cars. The location of the sun can be computed from the time, and its position relative to the driver can also be computed (the same is true for cars). Therefore, an icon can simply be displayed to block the undesired glare. Similarly, the displays can be integrated with other operator perceptible features, such as a haptic feedback, sound, seat or steering wheel vibration, etc.

FIGS. 4A–4C illustrate the operation of system 10 in greater detail. FIG. 4A is a functional block diagram of a portion of system 10 illustrating software components and internal data flow throughout system 10. FIG. 4B is a simplified flow diagram illustrating operation of system 10, and FIG. 4C is a simplified flow diagram illustrating target filtering in accordance with one embodiment of the present invention.

It is first determined whether system 10 is receiving vehicle location information from its primary vehicle location system. This is indicated by block 62 in FIG. 4B. In other words, where the primary vehicle location system constitutes a GPS receiver, this signal may be temporarily lost. The signal may be lost, for instance, when the vehicle goes under a bridge, or simply goes through a pocket or area where GPS or correction signals can not be received or is distorted. If the primary vehicle location signal is available, that signal is received as indicated by block 64. If not, system 10 accesses information from auxiliary inertial measurement unit 30.

Auxiliary IMU 30 may, illustratively, be complimented by a dead reckoning system which utilizes the last known position provided by the GPS receiver, as well as speed and angle information, in order to determine a new position. Receiving the location signal from auxiliary IMU 30 is illustrated by block 66.

In any case, once system 10 has received the vehicle location data, system 10 also optionally receives head or eye location information, as well as optional vehicle orientation data. As briefly discussed above, the vehicle orientation information can be obtained from a roll rate gyroscope 68 to obtain the roll angle, and a tilt sensor 70 (such as an accelerometer) to obtain the pitch angle as well as a yaw rate sensor 69 to obtain yaw angle 83. Obtaining the head or eye location data and the vehicle orientation data are illustrated by optional blocks 72 and 74 in FIG. 4B. Also, the optional driver's eye data is illustrated by block 76 in FIG. 4A, the vehicle location data is indicated by block 78, and the pitch and roll angles are indicated by blocks 80 and 82, respectively.

A coordinate transformation matrix is constructed, as described in greater detail below, from the location and heading angle of the moving vehicle, and from the optional driver's head or eye data and vehicle orientation data, where that data is sensed. The location data is converted into a local coordinate measurement using the transformation matrix, and is then fed into the perspective projection routines to calculate and draw the road shape and target icons in the computer's graphic memory. The road shape and target icons are then projected as a virtual view in the driver's visual field, as illustrated in FIG. 3B above.

The coordinate transformation block transforms the coordinate frame of the digital map from the global coordinate frame to the local coordinate frame. The local coordinate frame is a moving coordinate frame that is illustratively attached to the driver's head. The coordinate transformation is illustratively performed by multiplying a four-by-four homogeneous transformation matrix to the road data points although any other coordinate system transformations can be used, such as the Quaternion or other approach. Because the vehicle is kept moving, the matrix must be updated in real time. Movement of the driver's eye that is included in the matrix is also measured and fed into the matrix calculation in real time. Where no head tracking system 32 is provided, then the head angle and position of the driver's eyes, are assumed to be constant and the driver is assumed to be looking forward from a nominal position.

The heading angle of the vehicle is estimated from the past history of the GPS location data. Alternatively, a rate gyroscope can be used to determine vehicle heading as well. An absolute heading angle is used in computing the correct coordinate transformation matrix. As noted initially, though heading angle estimation by successive differentiation of GPS data can be used, any other suitable method to measure an absolute heading angle can be used as well, such as a magnetometer (electronic compass) or an inertial measurement unit. Further, where pitch and roll sensors are not used, these angles can be assumed to be 0.

In any case, after the vehicle position data 78 is received, the ranging information from ranging system 18 is also received by controller 12 (shown in FIG. 2). This is indicated by blocks 83 in FIG. 4A and by block 86 in FIG. 4B. The ranging data illustratively indicates the presence and location of targets around the vehicle. For example, the radar ranging system 18 developed and available from Eaton Vorad, or Delphi, Celsius Tech, or other vendors provides a signal indicative of the presence of a radar target, its range, its range rate and the azimuth angle of that target with respect to the radar apparatus.

Based on the position signal, controller 12 queries the digital road map in geospatial database 16 and extracts local road data 88. The local road data provides information with respect to road boundaries as seen by the operator in the position of the vehicle, and also other potential radar targets, such as road signs, road barriers, etc. Accessing geospatial database 16 (which can be stored on the vehicle and receive periodic updates or can be stored remotely and accessed wirelessly) is indicated by block 90 in FIG. 4B.

Controller 12 determines whether the targets indicated by target data 83 are expected targets. Controller 12 does this by examining the information in geospatial database 16. In other words, if the targets correspond to road signs, road barriers, bridges, or other information which would provide a radar return to ranging system 18, but which is expected because it is mapped into database 16 and does not need to be brought to the attention of the driver, that information can be filtered out such that the driver is not alerted to every single possible item on the road which would provide a radar return. Certain objects may a priori be programmed to be brought to the attention of the driver. Such items may be guard rails, bridge abutments, etc. . . . and the filtering can be selective, as desired. If, for example, the driver were to exit the roadway, all filtering can be turned off so all objects are brought to the driver's attention. The driver can change filtering based on substantially any predetermined filtering criteria, such as distance from the road or driver, location relative to the road or the driver, whether the objects are moving or stationary, or substantially any other criteria. Such criteria can be invoked by the user through the user interface, or they can be pre-programmed into controller 12.

However, where the geospatial database does not indicate an expected target in the present location, then the target information is determined to correspond to an unexpected target, such as a moving vehicle ahead of the vehicle on which system 10 is implemented, such as a stalled car or a pedestrian on the side of the road, or some other transitory target which has not been mapped to the geospatial database as a permanent, or expected target. It has been found that if all expected targets are brought to the operator's attention, this substantially amounts to noise such that when real targets are brought to the operator's attention, they are not as readily perceived by the operator. Therefore, filtering of targets not posing a threat to the driver is performed as is illustrated by block 92 in FIG. 4B.

Once such targets have been filtered, the frame transformation is performed using the transformation matrix. The result of the coordinate frame transformation provides the road boundary data, as well as the target data, seen from the driver's eye perspective. The road boundary and target data is output, as illustrated by block 94 in FIG. 4B, and as indicated by block 96 in FIG. 4A. Based on the output road and target data, the road and target shapes are generated by processor 12 for projection in the proper perspective.

Generation of road and target shapes is illustrated by block 98 in FIG. 4A, and the perspective projection is illustrated by blocks 100 in FIGS. 4A and 102 in FIG. 4B.

It should also be noted that the actual image projected is clipped such that it only includes that part of the road which would be visible by the operator with an unobstructed forward-looking visual field. Clipping is described in greater detail below, and is illustrated by block 104 in FIG. 4A. The result of the entire process is the projected road and target data as illustrated by block 106 in FIG. 4A.

FIG. 4C is a more detailed flow diagram illustrating how targets are projected or filtered from the display. First, it is determined whether ranging system 18 is providing a target signal indicating the presence of a target. This is indicated by block 108. If so, then when controller 12 accesses geospatial database 16, controller 12 determines whether sensed targets correlate to any expected targets. This is indicated by block 110. If so, the expected targets are filtered from the sensed targets. It should be noted that ranging system 18 may provide an indication of a plurality of targets at any given time. In that case, only the expected targets are filtered from the target signal. This is indicated by block 112. If any targets remain, other than the expected targets, the display signal is generated in which the unexpected, or transitory, targets are placed conformally on the display. This is indicated by block 114.

Of course, the display signal is also configured such that guidance markers (such as lane boundaries, lane striping or road edges) is also placed conformally on the display. This is indicated by block 116. The display signal is then output to the projector such that the conformal, augmented display is provided to the user. This is indicated by block 118.

It can thus be seen that the term "conformal" is used herein to indicate that the "virtual image" generated by the present system projects images represented by the display in a fashion such that they are substantially aligned, and in proper perspective with, the actual images which would be seen by the driver, with an unobstructed field of view. The term "augmented", as used herein, means that the actual image perceived by the operator is supplemented by the virtual image projected onto the head up display. Therefore, even if the driver's forward-looking visual field is obstructed, the augmentation allows the operator to receive and process information, in the proper perspective, as to the actual objects which would be seen with an unobstructed view.

A discussion of coordinate frames, in greater detail, is now provided for the sake of clarity. There are essentially four coordinate frames used to construct the graphics projected in display 22. Those coordinate frames include the global coordinate frame, the vehicle-attached coordinate frame, the local or eye coordinate frame, and the graphics screen coordinate frame. The position sensor may be attached to a backpack or helmet worn by a walking person in which case this would be the vehicle-attached coordinate frame. The global coordinate frame is the coordinate frame used for road map data construction as illustrated by FIG. 5A. The global coordinate frame is illustrated by the axes 120. All distances and angles are measured about these axes. FIG. 5A also shows vehicle 124, with the vehicle coordinate frame represented by axes 126 and the user's eye coordinate frame (also referred to as the graphic screen coordinate frame) illustrated by axes 128. FIG. 5A also shows road point data 130, which illustrates data corresponding to the center of road 132.

The capital letters "X", "Y" and "Z" in this description are used as names of each axis. The positive Y-axis is the direction to true north, and the positive X-axis is the direction to true east in global coordinate frame 120. Compass 122 is drawn to illustrate that the Y-axis of global coordinate frame 120 points due north. The elevation is defined by the Z-axis and is used to express elevation of the road shape and objects adjacent to, or on, the road.

All of the road points 130 stored in the road map file in geospatial database 16 are illustratively expressed in terms of the global coordinate frame 120. The vehicle coordinate frame 126, (V) is defined and used to express the vehicle configuration data, including the location and orientation of the driver's eye within the operator compartment, relative to the origin of the vehicle. The vehicle coordinate frame 126 is attached to the vehicle and moves as the vehicle moves. The origin is defined as the point on the ground under the location of the GPS receiver antenna. Everything in the vehicle is measured from the ground point under the GPS antenna. Other points, such as located on a vertical axis through the GPS receiver antenna or at any other location on the vehicle, can also be selected.

The forward moving direction is defined as the positive y-axis. The direction to the right when the vehicle is moving forward is defined as the positive x-axis, and the vertical upward direction is defined as the positive z-axis which is parallel to the global coordinate frame Z-axis. The yaw angle, i.e. heading angle, of the vehicle, is measured from true north, and has a positive value in the clockwise direction (since the positive z-axis points upward). The pitch angle is measured about the x-axis in coordinate frame 126 and the roll angle is measured as a rotation about the y-axis in coordinate frame 126.

The local L-coordinate frame 128 is defined and used to express the road data relative to the viewer's location and direction. The coordinate system 128 is also referred to herein as the local coordinate frame. Even though the driver's eye location and orientation may be assumed to be constant (where no head tracking system 30 is used) the global information still needs to be converted into the eye-coordinate frame 128 for calculating the perspective projection. The location of the eye, i.e. the viewing point, is the origin of the local coordinate frame. The local coordinate frame 128 is defined with respect to the vehicle coordinate frame. The relative location of the driver's eye from the origin of the vehicle coordinate frame is measured and used in the coordinate transformation matrix described in greater detail below. The directional angle information from the driver's line of sight is used in constructing the projection screen. This angle information is also integrated into the coordinate transformation matrix.

Ultimately, the objects in the outer world are drawn on a flat two-dimensional video projection screen which corresponds to the virtual focal plane, or virtual screen 50 perceived by human drivers. The virtual screen coordinate frame has only two axes. The positive x-axis of the screen is defined to be the same as the positive x-axis of the vehicle coordinate frame 126 for ease in coordinate conversion. The upward direction in the screen coordinate frame is the same as the positive z-axis and the forward-looking direction (or distance to the objects located on the visual screen) is the positive y-axis. The positive x-axis and the y-axis in the virtual projection screen 50 are mapped to the positive x-axis and the negative y-axis in computer memory space, because the upper left corner is deemed to be the beginning of the video memory.

Road data points including the left and right edges, which are expressed with respect to the global coordinate frame $\{G\}$ as $P_k$, shown in FIGS. 5B-1, are converted into the local coordinate frame $\{L\}$ which is attached to the moving vehicle 124 coordinate frame $\{V\}$. Its origin (Ov) and direction ($\theta$v) are changing continually as the vehicle 124 moves. The origin ($O_L$) of the local coordinate frame $\{L\}$, i.e. driver's eye location, and its orientation ($\theta_E$) change as the driver moves his or her head and eyeballs. Even though the driver's orientation ($\theta_E$) can be assumed as constant for a simplified embodiment of system 10, all of the potential effects are considered in the coordinate transformation equations below for a more detailed illustrative embodiment of system 10. All road data that are given in terms of the global coordinate frame $\{G\}$ ultimately need to be converted into the eye coordinate frame $\{L\}$. Then they are projected into the video screen 22 using a perspective transformation.

A homogeneous transformation matrix [T] was defined and used to convert the global coordinate data into local coordinate data. The matrix [T] is developed illustratively, as follows.

The parameters in FIGS. 5B-1 and 5B-2 are as follows:

$P_k$ is the k-th road point;

$O_G$ is the origin of the global coordinate frame;

$O_V$ is the origin of the vehicle coordinate frame with respect to the global coordinate frame; and $O_E$ is the origin of the local eye-attached coordinate frame.

Any point in 3-dimensional space can be expressed in terms of either a global coordinate frame or a local coordinate frame. Because everything seen by the driver is defined with respect to his or her location and viewing direction (i.e. the relative geometrical configuration between the viewer and the environment) all of the viewable environment should be expressed in terms of a local coordinate frame. Then, any objects or line segments can be projected onto a flat surface or video screen by means of the perspective projection. Thus, the mathematical calculation of the coordinate transformation is performed by constructing the homogenous transformation matrix and applying the matrix to the position vectors. The coordinate transformation matrix [T] is defined as a result of the multiplication of a number of matrices described in the following paragraphs.

To change the global coordinate data to the local coordinate data, the translation and rotation of the frame should be considered together. The translation of the coordinate frame transforms point data using the following matrix equation (with reference to FIG. 5C):

$$x = X - O_L X$$
$$y = Y - O_L Y$$
$$z = X - O_L Z \qquad \text{Eq. 1}$$

or $$\begin{bmatrix} x \\ y \\ z \\ 1 \end{bmatrix} = \begin{bmatrix} 1 & 0 & 0 & -O_L X \\ 0 & 1 & 0 & -O_L Y \\ 0 & 0 & 1 & -O_L Z \\ 0 & 0 & 0 & 1 \end{bmatrix} \begin{bmatrix} X \\ Y \\ Z \\ 1 \end{bmatrix} \text{ or } {}^L P = {}^L_G[T_{tran}]{}^G P \qquad \text{Eq. 2}$$

where, $${}^L P = \begin{bmatrix} x \\ y \\ z \\ 1 \end{bmatrix}, {}^G P = \begin{bmatrix} X \\ Y \\ Z \\ 1 \end{bmatrix}, \text{ and } {}^L_G[T_{tran}] = \begin{bmatrix} 1 & 0 & 0 & -O_L X \\ 0 & 1 & 0 & -O_L Y \\ 0 & 0 & 1 & -O_L Z \\ 0 & 0 & 0 & 1 \end{bmatrix} \qquad \text{Eq. 3}$$

The letter ${}^G P$ is a point in terms of coordinates X, Y, Z as referenced from the global coordinate system. The letter ${}^L p$ represents the same point in terms of x, y, z in the local coordinate system. The transformation matrix ${}^L_G[T_{tran}]$ allows for a translational transformation from the global G coordinate system to the local L coordinate system.

The rotation of the coordinate frame about the Z-axis can be expressed by the following matrix equation (with respect to FIG. 5D):

$$x = X \cos\theta + Y \sin\theta$$
$$y = -X \sin\theta + Y \cos\theta$$
$$z = Z \qquad \text{Eq. 4}$$

or, in matrix form $$\begin{bmatrix} x \\ y \\ z \\ 1 \end{bmatrix} = \begin{bmatrix} \cos\theta & \sin\theta & 0 & 0 \\ -\sin\theta & \cos\theta & 0 & 0 \\ 0 & 0 & 1 & 0 \\ 0 & 0 & 0 & 1 \end{bmatrix} \begin{bmatrix} X \\ Y \\ Z \\ 1 \end{bmatrix} \qquad \text{Eq. 5}$$

This equation can be written using the following matrix equation, $${}^L P = {}^L_G[T_{rot}]{}^G P \qquad \text{Eq. 6}$$

where, the rotational transformation from the G to the L coordinate system is $$_G^L[T_{rot}] = \begin{bmatrix} \cos\theta & \sin\theta & 0 & 0 \\ -\sin\theta & \cos\theta & 0 & 0 \\ 0 & 0 & 1 & 0 \\ 0 & 0 & 0 & 1 \end{bmatrix} \quad \text{Eq. 7}$$

For rotation and translation at the same time, these two matrices can be combined by the following equations, $$^L p = {}_G^L[T]\,^G P \quad \text{Eq. 8}$$

where $$_G^L[T] = {}_G^L[T_{rot}]\,_G^L[T_{tran}] \quad \text{Eq. 9}$$

$$= \begin{bmatrix} \cos\theta & \sin\theta & 0 & 0 \\ -\sin\theta & \cos\theta & 0 & 0 \\ 0 & 0 & 1 & 0 \\ 0 & 0 & 0 & 1 \end{bmatrix} \begin{bmatrix} 1 & 0 & 0 & -O_L X \\ 0 & 1 & 0 & -O_L Y \\ 0 & 0 & 1 & -O_L Z \\ 0 & 0 & 0 & 1 \end{bmatrix}$$

$$= \begin{bmatrix} \cos\theta & \sin\theta & 0 & -O_L X \cos\theta - O_L Y \sin\theta \\ -\sin\theta & \cos\theta & 0 & O_L X \sin\theta - O_L Y \cos\theta \\ 0 & 0 & 1 & -O_L Z \\ 0 & 0 & 0 & 1 \end{bmatrix}$$

This relationship can be expanded through the {G}, and {V}, and {L} coordinate frames. The coordinate transform matrix [T] was defined as follows assuming that only heading angles $\theta_E$ and $\theta_V$ are considered as rotational angle data;

$$^L p = {}_V^L[T]\,_G^V[T]\,^G P = [T]\,^G P \quad \text{Eq. 10}$$

where, $$[T] = \begin{bmatrix} C_E & S_E & 0 & -O_L X C_E - O_L Y S_E \\ -S_E & C_E & 0 & +O_L X S_E - O_L Y C_E \\ 0 & 0 & 1 & -O_L Z \\ 0 & 0 & 0 & 1 \end{bmatrix} \quad \text{Eq. 11}$$

$$\begin{bmatrix} C_V & S_V & 0 & -O_V X C_V - O_X Y S_V \\ -S_V & C_V & 0 & +O_V X S_V - O_V Y C_V \\ 0 & 0 & 1 & -O_V Z \\ 0 & 0 & 0 & 1 \end{bmatrix}$$

and, $c_E = \cos\theta_E, s_E = \sin\theta_E, c_V = \cos\theta_V,$ and $s_V = \sin\theta_V$ $c_{E+V} = \cos(\theta_E + \theta_V)$, and $s_{E+V} = \sin(\theta_E + \theta_V)$ Eq. 12

The resultant matrix [T] is then as follows:

$$[T] = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} \quad \text{Eq. 13}$$

where, $T_{11} = c_E c_v - s_E s_v = \cos(\theta_E + \theta_V)$ Eq. 14

$T_{12} = c_E s_v + s_E c_v = \sin(\theta_E + \theta_V)$ Eq. 15

$T_{13} = 0$ Eq. 16

$T_{14} = c_E(-O_V X c_v - O_V Y s_V) = s_E(-O_V X s_v - O_V Y c_V) +$ Eq. 17
$(-O_L X c_E - O_L Y s_E)$
$= -c_{E+V}(-O_V X + O_L X c_V - O_L Y s_V) -$
$s_{E+V}(O_V Y + O_L X s_V + O_L X c_V)$ $T_{21} = -s_E c_v - c_E s_V = -\sin(\theta_E + \theta_V)$ Eq. 18

$T_{22} = -s_E s_V - c_E c_V = \cos(0_E + 0_V)$ Eq. 19

$T_{23} = 0$ Eq. 20

$T_{21} = -S_E C_v - C_E S_V = -\sin(\theta_E + \theta_V)$ Eq. 18

$T_{22} = -S_E S_V + C_E C_V = \cos(0_E + 0_V)$ Eq. 19

$T_{23} = 0$ Eq. 20

$T_{24} = s_E(O_V X c_V + O_V Y S_V) + c_E(O_V X s_V - O_V Y c_v) +$ Eq. 21
$(O_L X s_E - O_L Y c_E)$
$= s_{E+V}(O_V X + O_L X c_V - O_L Y s_V) - s_{E+V}(O_V Y +$
$= O_L X s_V + O_L X c_V)$ $T_{31} = 0$ Eq. 22

$T_{32} = 0$ Eq. 23

$T_{33} = 1$ Eq. 24

$T_{34} = -O_{LV} - O_{LZ}$ Eq. 25

$T_{41} = 0$ Eq. 26

$T_{31} = 0$ Eq. 22

$T_{32} = 0$ Eq. 23

$T_{33} = 1$ Eq. 24

$T_{34} = -O_{LV} - O_{LZ}$ Eq. 25

$T_{41} = 0$ Eq. 26

$T_{42} = 0$ Eq. 27

$T_{43} = 0$ Eq. 28

$T_{44} = 1$ Eq. 29

By multiplying the road points P by the [T] matrix, we will have local coordinate data p. The resultant local coordinate value p is then fed into the perspective projection routine to calculate the projected points on the heads up display screen 22. The calculations for the perspective projection are now discussed.

After the coordinate transformation, all the road data are expressed with respect to the driver's viewing location and orientation. These local coordinate data are illustratively projected onto a flat screen (i.e., the virtual screen 50 of heads up display 22). Shown in FIGS. 5E-1 to 5F-3).

Projecting the scene onto the display screen can be done using simple and well-known geometrical mathematics and computer graphics theory. Physically, the display screen is the virtual focal plane. Thus, the display screen is the plane, which is located at $S_y$ position, parallel to the z-x plane, where $s_x, s_z$ are the horizontal and vertical dimensions of the display screen. Where the object is projected onto the screen, it should be projected with the correct perspective so that the projected images match with the outer scene. It is desirable that the head up display system match the drawn road shapes (exactly or at least closely) the actual road which is in front of the driver. The perspective projection makes closer objects appear larger and further objects appear smaller.

The prospective projection can be calculated from triangle similarity as shown in FIGS. 5G to 5H-2. From the figures, one can find the location of the point s(x,z) for the known data p(x,y,z).

The values of $s_x$ and $s_z$ can be found by similarity of triangles.

$$p_y:s_y=p_x:s_x \qquad \text{Eq. 30}$$

so, $$s_x = p_x \frac{s_y}{p_y} \qquad \text{Eq. 31}$$

$$s_z = p_z \frac{s_y}{p_y} \qquad \text{Eq. 32}$$

As expected, $s_x$ and $s_z$ are small when the value $p_y$ is big (i.e. when the object is located far away). This is the nature of perspective projection.

After calculating the projected road point on the display screen by the prospective projection, the points are connected using straight lines to build up the road shapes. The line-connected road shape provides a better visual cue of the road geometry than plotting just a series of dots.

The road points that have passed behind the driver's moving position do not need to be drawn. Furthermore, because the projection screen has limited size, only road points and objects that fall within the visible field of view need to be drawn on the projection screen. Finding and then not attempting to draw these points outside the field of view can be important in order to reduce the computation load of controller 12 and to enhance the display refresh speed.

The visible limit is illustrated by FIGS. 5I to 5J-3. The visible three-dimensional volume is defined as a rectangular cone cut at the display screen. Every object in this visible region needs to be displayed on the projection screen. Objects in the small rectangular cone defined by $O_L$ and the display screen, a three dimensional volume space between the viewer's eye and the displaying screen, is displayed in an enlarged size. If the object in this region is too close to the viewer, then it results in an out of limit error or a divide by zero error during the calculation. However, usually there are no objects located in the "enlarging space." FIGS. 5J-1 to 5J-3 and the following equations of lines were used for checking whether an object is in the visible space or not. Using these clipping techniques, if the position of a point in the local coordinate frame is defined as p(x, y, z) then this point is visible to the viewer only if:

the point p is in front of the $y=+c_1x$ plane (which is marked as dark in the top view diagram of FIG. 5J-1);
the point p is in front of the $y=-c_1x$ plane;
the point p is in front of the $y=+c_2z$ plane (the dark region in the right hand side view diagram of FIGS. 5J-3);
the point p is in front of the $y=-c_2z$ plane; and
the point p is in front of the display screen.

Equations in the diagram of FIGS. 5J-1 to 5J-3 (e.g. $y=+c_1x$) are not line-equations but equations of planes in 3 dimensional space. The above conditions can be expressed by the following equations mathematically, which describe what we mean by "in front of"

$$p_y>+c_1p_x \qquad \text{Eq. 33}$$

$$p_y>-c_1p_x \qquad \text{Eq. 34}$$

$$p_y>+c_2p_z \qquad \text{Eq. 35}$$

$$p_y>-c_2p_z \qquad \text{Eq. 36}$$

and $$p_y>s_y \qquad \text{Eq. 37}$$

Only those points that satisfy all of the five conditions are in the visible region and are then drawn on the projection screen.

In some cases, there could be a line segment of the road whose one end is in the visible region and the other is out of the visible region. In this case, the visible portion of the line segment should be calculated and drawn on the screen. FIGS. 5K-1 to 5K-3 show one of many possible situations. FIGS. 5K-1 is a top view, which is a projection of the xy plane. It will now be described how to locate point p so that only the contained segment is drawn.

The range of the ratio value k marked as the distance between point p and $p_1$ is from 0.0 to 1.0. The position of point p can be written as, $$p=p_1+k(p_2-p_1)=p_1+k\Delta p \qquad \text{Eq. 38}$$

where, k is an arbitrary real number, ($0 \leq k \leq 1$) and
$p_1=(p_{1x}, p_{1y}, p_{1z})$, $p_2=(p_{2x}, p_{2y}, p_{2z})$, and
$\Delta p=p_2-p_1=(p_{2x}-p_{1x}, p_{2y}-p_{1y}, p_{2z}-p_{1z})$ The x and y components of the above equation can be written as follows:

$$p_x=p_{1x}+k\Delta p_x \qquad \text{Eq. 39}$$

$$p_y=p_{1y}+k\Delta p_y \qquad \text{Eq. 40}$$

The x and y components of point p also should satisfy the line equation $y=+c_1x$ in order to intersect with the line. Therefore, $$p_y=p_{1y}+k\Delta p_y=c_1(p_{1x}+k\Delta p_x)=c_1p_{1x}+kc_1\Delta p_x \qquad \text{Eq. 41}$$

$$k(\Delta p_y-c_1\Delta p_x)=c_1p_{1x}-p_{1y} \qquad \text{Eq. 42}$$

then, $$k = \frac{c_1p_{1x} - p_{1,y}}{\Delta p_y - c_1\Delta p_x} \qquad \text{Eq. 43}$$

Applying the value k to the above equation $p_x$, $p_y$ and $p_z$ can be determined as follows, $$p_x = p_{1x} + \Delta p_x \frac{c_1p_{1x} - p_{1,y}}{\Delta p_y - c_1\Delta p_x} \qquad \text{Eq. 44}$$

$$p_y = p_{1y} + \Delta p_y \frac{c_1p_{1x} - p_{1,y}}{\Delta p_y - c_1\Delta p_x} \qquad \text{Eq. 45}$$

$$p_z = p_{1z} + \Delta p_z \frac{c_1p_{1x} - p_{1,y}}{\Delta p_y - c_1\Delta p_x} \qquad \text{Eq. 46}$$

Using these values of $p_x$, $p_y$ and $p_z$, the projected values $s_x$ and $s_z$ can be calculated by a perspective projection in the same manner as the other parameters.

FIG. 6 illustrates a vehicle 200 with placement of ranging system 18 thereon. Vehicle 200 is, illustratively, a snow plow which includes an operator compartment 202 and a snow plow blade 204. Ranging system 18, in the embodiment illustrated in FIG. 6, includes a first radar subsystem 206 and a second radar subsystem 208. It can be desirable to be able to locate targets closely proximate to blade 204. However, since radar subsystems 206 and 208 are directional, it is difficult, with one subsystem, to obtain target coverage close to blade 204, yet still several hundred meters ahead of vehicle 200, because of the placement of blade 204. Therefore, in one embodiment, the two subsystems 206 and 208 are employed to obtain ranging system 18. Radar subsystem 208 is located just above blade 204 and is directed approximately straightforwardly, in a horizontal plane. Radar subsystem 206 is located above blade 204 and is directed downwardly, such that targets can be detected closely proximate the front of blade 204. The radar subsystems 206 and 208 are each illustratively an array of aligned radar detectors which is continuously scanned by a processor such that radar targets can be detected, and their range, range rate and azimuth angle from the radar subsystem 206 or 208 can be estimated as well. In this way, information regarding the location of radar targets can be provided to controller 12 such that controller 12 can display an icon or other visual element representative of the target on the head up display 22. Of course, the icon can be opaque or transparent.

It should also be noted that, while the target illustrated in FIG. 3C is round, and could represent a pedestrian, a vehicle, or any other radar target, the icon representative of the target can be shaped in any desirable shape. In addition, bit maps can be placed on the head up display 22 which represent targets. Further, targets can be small, colored or otherwise coded to indicate distance. In other words, if the targets are very close to vehicle 200, they can be large, begin to flash, or turn red. Similarly, if the targets are a long distance from vehicle 200, they can maintain a constant glow or halo.

FIG. 7 is a flow diagram illustrating how ranging system 18 can be used, in combination with the remainder of the system, to verify operation of the subsystems. First, controller 12 receives a position signal. This is indicated by block 210. This is the signal, illustratively, from the vehicle location system 14. Controller 12 then receives a ranging signal, as indicated by block 212 in FIG. 7. This is the signal from ranging system 18 which is indicative of targets located within the ranging field of vehicle 200. Next, controller 12 queries geospatial database 16. This is indicated by block 214. In querying geospatial database 16, controller 12 verifies that targets, such as street signs, road barriers, etc. are in the proper places, as detected by the signal received by ranging system 18 in block 212. If the targets identified by the target signal correlate to expected targets in geospatial database 16 given the current position of the vehicle, then controller 12 determines that system 10 is operating properly. This is indicated by block 216 and 218. In view of this determination, controller 12 can provide an output to user interface 20 indicating that the system is healthy.

If, however, the detected targets do not correlate to expected targets in the geospatial database for the current vehicle position, then controller 12 determines that something is not operating correctly, either the ranging system 18 is malfunctioning, the vehicle positioning system is malfunctioning, information retrieval from the geospatial database 16 is malfunctioning or the geospatial database 16 has been corrupted, etc. In any case, controller 12 illustratively provides an output to user interface (UI) 20 indicating a system problem exists. This is indicated by block 220. Therefore, while controller 12 may not be able to detect the exact type of error which is occurring, controller 12 can detect that an error is occurring and provide an indication to the operator to have the system checked or to have further diagnostics run.

It should also be noted that the present invention need not be provided only for the forward-looking field of view of the operator. Instead, the present system 10 can be implemented as a side-looking or rear-looking virtual mirror. In that instance, ranging system 18 includes radar detectors (or other similar devices) located on the sides or to the rear of vehicle 200. The transformation matrix would be adjusted to transform the view of the operator to the side looking or rear looking, field of view as appropriate.

Vehicles or objects which are sensed, but which are not part of the fixed geospatial landscape are presented iconically based on the radar or other range sensing devices in ranging system 18. The fixed lane boundaries, of course, are also presented conformally to the driver. Fixed geospatial landmarks which may be relevant to the driver (such as the backs of road signs, special pavement markings, bridges being passed under, watertowers, trees, etc.) can also be presented to the user, in the proper prospective. This gives the driver a sense of motion as well as cues to proper velocity.

One illustration of the present invention as both a forward looking driver assist device and one which assists in a rear view is illustrated in FIG. 8. A forward-looking field of view is illustrated by block 250 while the virtual rear view mirror is illustrated by block 252. It can be seen that the view is provided, just as the operator would see when looking in a traditional mirror. It should also be noted that the mirror may illustratively be virtually gimbaled along any axis (i.e., the image is rotated from side-to-side or top-to-bottom) in software such that the driver can change the angle of the mirror, just as the driver currently can mechanically, to accommodate different driver sizes, or to obtain a different view than is currently being represented by the mirror.

FIG. 9 gives another illustrative embodiment of a vehicle positioning system which provides vehicle position along the roadway. The system illustrated in FIG. 9 can, illustratively, be used as the auxiliary vehicle positioning system 30 illustrated in FIG. 2A. This can provide vehicle positioning information when, for example, the DGPS signal is lost, momentarily, for whatever reason. In the embodiment illustrated in FIG. 9, vehicle 200 includes an array of magnetic sensors 260. The road lane 262, is bounded by magnetic strips 264 which, illustratively, are formed of tape having magnetized portions 266 therein. Although a wide variety of such magnetic strips could be used, one illustrative embodiment is illustrated in U.S. Pat. No. 5,853,846 to the 3M Company of St. Paul, Minn. The magnetometers in strip 260 are monitored such that the field strength sensed by each magnetometer is identified. Therefore, as the vehicle approaches strip 260 and begins to cross lane boundary 268, magnetometers 270 and 272 begin to provide a signal indicating a larger field strength.

Scanning the array of magnetometers is illustratively accomplished using a microprocessor which scans them quickly enough to detect even fairly high frequency changes in vehicle position toward or away from the magnetic elements in the marked lane boundaries. In this way, a measure of the vehicle's position in the lane can be obtained, even if the primary vehicle system is temporarily not working. Further, while FIG. 9 shows magnetometers mounted to the front of the vehicle, they can be mounted to the rear as well. This would allow an optional calculation of the vehicle's yaw angle relative to the magnetic strips.

FIG. 10 is a block diagram of another embodiment of the present invention. All items are the same as those illustrated in FIG. 1 and are similarly numbered, and operate substantially the same way. However, rather than providing an output to display 22, controller 12 provides an output to neurostimulator 300. Neurostimulator 300 is a stimulating device which operates in a known manner to provide stimulation signals to the cortex to elicit image formation in the brain. The signal provided by controller 12 includes information as to eye perspective and image size and shape, thus enhancing the ability of neurostimulator 300 to properly stimulate the cortex in a meaningful way. Of course, as the person using the system moves and turns the head, the image stimulation will change accordingly.

It can thus be seen that the present invention provides a significant advancement in the art of mobility assist devices, particularly, with respect to moving in conditions where the outward looking field of view of the observer is partially or fully obstructed. In an earth-based motor vehicle environment, the present invention provides assistance in not only lane keeping, but also in collision avoidance, since the driver can use the system to steer around displayed obstacles. Of course, the present invention can also be used in many environments such as snow removal, mining or any other environment where airborne matter obscures vision. The invention can also be used in walking or driving in low light areas or at night, or through wooden or rocky areas where vision is obscured by the terrain. Further, the present invention can be used on ships or boats to, for example, guide the water-going vessel into port, through a canal, through lock and dams, around rocks or other obstacles.

Of course, the present invention can also be used on non-motorized, earth-based vehicles such as bicycles, wheelchairs, by skiers or substantially any other vehicle. The present invention can also be used to aid blind or vision impaired persons.

Although the present invention has been described with reference to preferred embodiments, workers skilled in the art will recognize that changes may be made in form and detail without departing from the spirit and scope of the invention.

What is claimed is:

1. A mobile assist device for use with a motorized vehicle having an operating position at which an operator controls the vehicle, the device comprising:
   a data storage system containing stored objects each defining a location of corresponding real world objects; and
   a display configured to display virtual images representing the stored objects in a position that generates a visual effect of the virtual images being projected on the corresponding real world objects when the virtual images are viewed by the operator in the operating position.

2. The device of claim 1, wherein:
   the stored objects define a location of lane boundaries of a road; and
   the virtual images presented on the display include a line that substantially overlays the lane boundary of the road corresponding to the stored objects when viewed by the operator in the operating position.

3. The device of claim 2, wherein the stored objects correspond to at least one of a center lane boundary, a left lane boundary, and a right lane boundary of the road.

4. The device of claim 1, wherein the display includes a screen on which the virtual images are displayed.

5. The device of claim 4, wherein the screen comprises a liquid crystal display film.

6. A mobility assist device for use with a motorized vehicle having an operating position at which an operator controls the motorized vehicle, the device comprising:
   a data storage system;
   object data contained in the data storage system, the object data including location information of a real world object in a three dimensional coordinate system; and
   a display attached to the motorized vehicle and including a graphical image that is positioned to produce a visual effect of the graphical image being projected on the corresponding real world object when viewed from a perspective of the operator in the operating position.

7. The device of claim 6, wherein the graphical image is positioned in line with a line of sight between the operator in the operating position and the corresponding real world object.

8. The device of claim 6, wherein a size of the graphical image changes in response to a change in the position of the operating position relative to the corresponding real world object.

9. The device of claim 8, wherein the size of the graphical image becomes smaller as the operating position moves away from the corresponding real world object.

10. The device of claim 8, wherein the size of the graphical image becomes larger as the operating position moves toward the corresponding real world object.

11. The device of claim 6, wherein the graphical image is representative of the corresponding real world object.

12. The device of claim 11, wherein the real world object includes a lane marking on a road and the graphical image includes a line having a shape that substantially matches the shape of the lane marking such that it appears to be projected on the lane marking when viewed from the perspective of the operator in the operating position.

13. The device of claim 11, wherein the graphical image corresponds to a lane marking on a road.

14. The device of claim 11, wherein the corresponding real world object is located adjacent to a road on which the motorized vehicle is located.

15. The device of claim 14, wherein the corresponding real world object includes a guardrail alongside the road, and the graphical image includes a representation of the guardrail, which appears to be projected on the guardrail when viewed from the perspective of the operator in the operating position.

16. The device of claim 6, wherein the display includes a screen on which the graphical image is presented.

17. The device of claim 16, wherein the screen is positioned between a window of the motorized vehicle and the operating position.

18. The device of claim 17, wherein the screen is transparent.

19. The device of claim 18 including a projector configured to project the graphical image onto the screen.

20. The device of claim 6, wherein the position of the graphical image is based on the object data, a location of the operating position, and a location of the display in the three dimensional coordinate system.

21. The device of claim 6 including an object detection system configured to detect objects outside of the motorized vehicle that are within a field of view of the operator, wherein the display includes tracking graphical images that are positioned in the display to produce a visual effect of being projected on the real world objects that are detected by the object detection system.

22. A mobility assist device for use with a motorized vehicle having an operating position at which an operator controls the motorized vehicle, the device comprising:

a data storage system;

objects data contained in the data storage system, the objects data including location information of real world objects in a three dimensional coordinate system; and a display attached to the motorized vehicle and including graphical images that are positioned in the display such that they appear to be projected on the corresponding real world objects when viewed from a perspective of the operator in the operating position.

23. The device of claim 22, wherein the graphical images are positioned in line with a line of sight between the operator in the operating position and the corresponding real world objects.

24. The device of claim 12, wherein a size of the graphical images changes in response to a change in the position of the operating position relative to the corresponding real world objects.

25. The device of claim 24, wherein the size of the graphical images becomes smaller as the operating position moves away from the corresponding real world objects.

26. The device of claim 24, wherein the size of the graphical images becomes larger as the operating position moves toward the corresponding real world objects.

27. The device of claim 22, wherein the graphical images are representative of the corresponding real world objects.

28. The device of claim 27, wherein the real world objects include first and second lane markings on a road and the graphical images include first and second lines having a shape that substantially matches a shape of the first and second lane markings, respectively, such that the first and second lines appear to be projected on the first and second lane markings when viewed from the perspective of the operator in the operating position.

29. The device of claim 27, wherein the graphical images correspond to real world lane markings of a road.

30. The device of claim 27, wherein the corresponding real world objects include an object that is located adjacent to a road on which the motorized vehicle is located.

31. The device of claim 30, wherein the corresponding real world object located adjacent the road includes a guardrail alongside the road, and the graphical images include a representation of the guardrail, which appears to be projected on the guardrail when viewed from the perspective of the operator in the operating position.

32. The device of claim 22, wherein the display includes a screen on which the graphical image is presented.

33. The device of claim 32, wherein the screen is positioned between a window of the motorized vehicle and the operating position.

34. The device of claim 32, wherein the screen is transparent.

35. The device of claim 32 including a projector configured to project the graphical image onto the screen.

36. The device of claim 22, wherein the positions of the graphical images are based on the objects data, a location of the operating position, and a location of the display in the three dimensional coordinate system.

37. A mobility assist device comprising:

a motorized vehicle having an operating position at which an operator controls the motorized vehicle;

a data storage system accessible from the motorized vehicle;

objects data contained in a data storage system, the objects data including location information of real world objects in a three dimensional coordinate system; and a display attached to the motorized vehicle and including graphical images that are displayed in a position such that they appear to be projected on the corresponding real world objects when viewed by the operator in the operating position, wherein the positions of the graphical images are based on the objects data, a location of the operating position, and a location of the display in the three dimensional coordinate system.

38. The device of claim 37, wherein the motorized vehicle is an automobile and the real world objects correspond to features of a road on which the motorized vehicle is located.

39. The device of claim 37, wherein the graphical images are positioned in line with a line of sight between the operator in the operating position and the corresponding real world objects.

40. The device of claim 37, wherein a size of the graphical images changes in response to a change in the position of the operating position relative to the corresponding real world objects.

41. The device of claim 40, wherein the size of the graphical images becomes smaller as the operating position moves away from the corresponding real world objects.

42. The device of claim 40, wherein the size of the graphical images becomes larger as the operating position moves toward the corresponding real world objects.

43. The device of claim 37, wherein the graphical images are representative of the corresponding real world objects.

44. The device of claim 43, wherein the real world objects include first and second lane markings on a road and the graphical images include first and second lines having a shape that substantially matches a shape of the first and second lane markings, respectively, such that the first and second lines appear to be projected on the first and second lane markings when viewed from the perspective of the operator in the operating position.

45. The device of claim 43, wherein the graphical images correspond to real world lane markings of a road.

46. The device of claim 43, wherein the corresponding real world objects include an object that is located adjacent to a road on which the motorized vehicle is located.

47. The device of claim 46, wherein the corresponding real world object located adjacent the road includes a guardrail alongside the road, and the graphical images include a representation of the guardrail, which appears to be projected on the guardrail when viewed from the perspective of the operator in the operating position.

48. The device of claim 37 wherein the display includes a screen on which the graphical image is presented.

49. The device of claim 48, wherein the screen is positioned between a window of the motorized vehicle and the operating position.

50. The device of claim 48, wherein the screen is transparent.

51. The device of claim 48 including a projector configured to project the graphical image onto the screen.

* * * * *

UNITED STATES PATENT AND TRADEMARK OFFICE
CERTIFICATE OF CORRECTION

PATENT NO. : 6,977,630 B1
APPLICATION NO. : 09/618613
DATED : December 20, 2005
INVENTOR(S) : Max Donath et al.

It is certified that error appears in the above-identified patent and that said Letters Patent is hereby corrected as shown below:

Column 16,
Line 8, delete Eq. 19 and insert new Eq. 19 as follows:

$$T_{22} = -s_E s_V + c_E c_V = \cos(0_E + 0_V) \qquad \text{Eq. 19}$$

Lines 13-18, delete second occurrences of Eq. 18, Eq. 19 and Eq. 20.
Lines 21 and 22, delete Eq. 21 and insert new Eq. 21 as follows:

$$= s_{E+V}(O_V X + O_L X c_V - O_L Y s_V) - c_{E+V}(O_V Y + O_L X s_V + O_L Y c_V)$$

Line 29, delete Eq. 25 and insert new Eq. 25 as follows:

$$T_{34} = -O_{L.V} - O_{L.Z} \qquad \text{Eq. 25}$$

Lines 32-40, delete second occurrences of Eq. 22, Eq. 23, Eq. 24, Eq. 25 and Eq. 26.

Signed and Sealed this

Twentieth Day of June, 2006

JON W. DUDAS
*Director of the United States Patent and Trademark Office*